(12) United States Patent
Uemura et al.

(10) Patent No.: US 9,493,705 B2
(45) Date of Patent: Nov. 15, 2016

(54) POLYMERIZABLE LIQUID CRYSTAL COMPOUND, POLYMERIZABLE COMPOSITION, POLYMER MATERIAL, AND FILM

(71) Applicant: FUJIFILM Corporation, Tokyo (JP)

(72) Inventors: Minoru Uemura, Ashigarakami-gun (JP); Yasuhiro Ishiwata, Ashigarakami-gun (JP); Masaru Yoshikawa, Ashigarakami-gun (JP); Takao Taguchi, Ashigarakami-gun (JP); Tomoki Tasaka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/201,060

(22) Filed: Mar. 7, 2014

(65) Prior Publication Data

US 2014/0183410 A1 Jul. 3, 2014

Related U.S. Application Data

(63) Continuation of application No. PCT/JP2012/072592, filed on Sep. 5, 2012.

(30) Foreign Application Priority Data

Sep. 8, 2011 (JP) .................................. 2011-195958
Feb. 13, 2012 (JP) .................................. 2012-028885

(51) Int. Cl.
*C07C 69/76* (2006.01)
*C09K 19/20* (2006.01)
*G02B 5/30* (2006.01)
*C09K 19/38* (2006.01)
*G02B 1/10* (2015.01)
*G02B 1/11* (2015.01)
(Continued)

(52) U.S. Cl.
CPC ........... *C09K 19/3838* (2013.01); *C09K 19/50* (2013.01); *G02B 1/105* (2013.01); *G02B 1/11* (2013.01); *G02B 5/208* (2013.01); *G02B 5/3016* (2013.01); *G02B 5/3083* (2013.01); *C09K 2019/0448* (2013.01); *C09K 2019/2078* (2013.01); *C09K 2219/03* (2013.01); *G03H 2001/0264* (2013.01)

(58) Field of Classification Search
CPC .................. C09K 19/3838; C09K 2019/0448; C09K 2019/2078; C09K 2219/03; G02B 5/208; G02B 5/3016; G02B 5/3083; C07C 69/618; C07C 69/76
See application file for complete search history.

(56) References Cited

U.S. PATENT DOCUMENTS 6,733,689 B1 5/2004 Meyer et al.
6,899,824 B2 5/2005 Meyer et al.
(Continued)

FOREIGN PATENT DOCUMENTS

CN 101010414 A 8/2007
CN 101052613 A 10/2007
(Continued)

OTHER PUBLICATIONS

Japanese Office Action with a partial English translation thereof, dated Dec. 2, 2014, for Japanese Application No. 2012-028885.
(Continued)

*Primary Examiner* — Shean C Wu
(74) *Attorney, Agent, or Firm* — Birch, Stewart, Kolasch & Birch, LLP

(57) ABSTRACT

A polymerizable liquid-crystal compound of formula (I) effective for preventing crystal deposition after coating with polymerizable liquid crystal (II) or a polymerizable liquid crystal similar thereto. P represents a polymerizable functional group; Sp represents a spacer or a single bond; $Z^1$ and $Z^2$ each represent —CO—O—; $R^0$ represents a linear alkyl group having 1-15 carbon atoms; $R^2$, $R^3$ and $R^4$ each independently represent an alkyl group having 1-4 carbon atoms, an alkoxy group having 1-4 carbon atoms, an alkoxycarbonyl group having 2-5 carbon atoms, an acyloxy group having 2-5 carbon atoms, an acyl group having 2-4 carbon atoms, an amide group having 2-5 carbon atoms, a cyano group, an amino group, a hydroxyl group, or a halogen atom; $r_1$, $r_2$ and $r_3$ indicate an integer from 0-4; when $r_1$, $r_2$ and $r_3$ each are 2 or more, then $R^2$, $R^3$ and $R^4$ each may be the same or different; however, when $R^0$ is a methyl group, then $r_2$ is not 1.

(I)

P—Sp—⟨⟩—$Z^1$—⟨⟩—$Z^2$—⟨⟩—$R^0$
    $(R^2)_{r1}$   $(R^3)_{r2}$   $(R^4)_{r3}$ (II)

16 Claims, No Drawings

(51) Int. Cl.
*G02B 5/20* (2006.01)
*C09K 19/50* (2006.01)
C09K 19/04 (2006.01)
G03H 1/02 (2006.01)

(56) References Cited

U.S. PATENT DOCUMENTS

| | | | |
|---|---|---|---|
| 7,683,203 B2 | 3/2010 | Irisawa et al. | |
| 9,120,883 B2* | 9/2015 | Kusumoto | C09K 19/2007 |
| 9,229,142 B2* | 1/2016 | Sato | G02B 1/04 |
| 9,383,491 B2* | 7/2016 | Takeda | G02B 5/3016 |
| 2004/0140451 A1 | 7/2004 | Meyer et al. | |
| 2005/0045854 A1 | 3/2005 | Radcliffe et al. | |
| 2007/0282087 A1 | 12/2007 | Irisawa et al. | |
| 2008/0049319 A1* | 2/2008 | Kato et al. | 359/485 |
| 2008/0143943 A1* | 6/2008 | May | C09K 19/18 349/117 |
| 2009/0323011 A1* | 12/2009 | He | C09K 19/0403 349/182 |
| 2013/0309411 A1 | 11/2013 | Kuwana et al. | |
| 2014/0080990 A1 | 3/2014 | Kusumoto et al. | |
| 2014/0183410 A1* | 7/2014 | Uemura et al. | 252/299.64 |

FOREIGN PATENT DOCUMENTS

| | | |
|---|---|---|
| JP | 2002-536529 A | 10/2002 |
| JP | 2009-086260 A | 4/2009 |
| JP | 2009-86354 A | 4/2009 |
| JP | 2009-184974 A | 8/2009 |
| JP | 2009-186785 A | 8/2009 |
| JP | 2009-286976 A | 12/2009 |
| JP | 2010-084032 A | 4/2010 |
| JP | 2011-213614 A | 10/2011 |
| WO | WO 2006/027076 A1 | 3/2006 |
| WO | WO 2009/158483 A1 | 12/2009 |
| WO | WO 2012/090785 A1 | 7/2012 |
| WO | WO 2012/144331 A1 | 10/2012 |

OTHER PUBLICATIONS

Translation of International Preliminary Report on Patentability dated Mar. 20, 2014, issued in PCT/JP2012/072592 (Forms PCT/IB/338, PCT/IB/373, PCT/IB/326).
Written Opinion of the International Searching Authority dated Oct. 2, 2012, issued in PCT/JP2012/072592 (Form PCT/ISA/237).
Chinese Office Action and Search Report for Chinese Application No. 201280043114.3, dated Feb. 16, 2015, with an English translation.
Extended European Search Report for European Application No. 12829443.6, dated Apr. 28, 2015.
Van Meter et al., "Synthesis and Mesomorphic Properties of Phenyl 4-Benzoyloxybenzoate Derivatives," Molecular Crystals and Liquid Crystals, vol. 22, 1973, pp. 285-299.
Broer et al. "Photo-Induced Diffusion in Polymerizing Chiral-Nematic Media", pp. 573-578, Adv. Mater. 1999, vol. 11, No. 7.
International Search Report for PCT/JP2012/072592 dated Oct. 2, 2012.
Chinese Office Action dated Aug. 14, 2015, issued in corresponding Chinese Patent Application No. 201280043114.3.
Third Office Action for Chinese Application No. 201280043114.3 dated Feb. 19, 2016 with English language translation.

\* cited by examiner

POLYMERIZABLE LIQUID CRYSTAL COMPOUND, POLYMERIZABLE COMPOSITION, POLYMER MATERIAL, AND FILM

CROSS-REFERENCE TO RELATED APPLICATIONS

This application is a continuation application of International Application No. PCT/JP2012/072592, filed Sep. 5, 2012, which in turn claims the benefit of priority from Japanese Application No. 2011-195958, filed Sep. 8, 2011 and Japanese Application No. 2012-028885, filed Feb. 13, 2012, the disclosures of which applications are incorporated by reference herein in their entirety.

BACKGROUND OF THE INVENTION

1. Field of the Invention

The present invention relates to a polymerizable liquid-crystal compound, a polymerizable composition and a polymer material that are useful in various applications including materials for various optical members such as optically-anisotropic films, heat-shielding films, etc., and relates to a film that utilizes these.

2. Background Art

Liquid-crystal materials are utilized in many industrial fields of retardation plates, polarization elements, selective reflection films, color filters, antireflection films, viewing angle compensation films, holography, alignment films and others (NPL 1). Above all, a polymerizable liquid-crystal compound (II) is used in many applications, as having general versatility owing to the simple structure thereof (for example, Patent Literatures 1 to 5).

[Chem. 1]

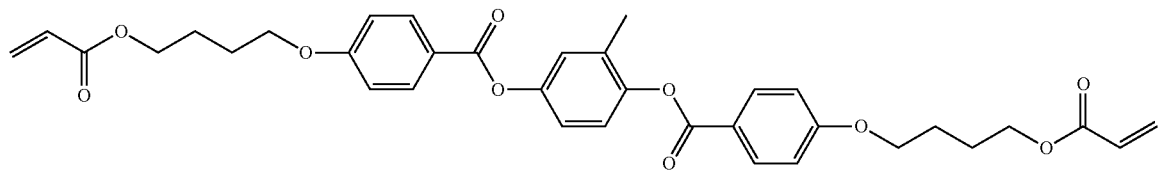

(II)

CITATION LIST

Patent Literature

Patent Literature 1: JP-A 2010-84032
Patent Literature 2: JP-A 2009-286976
Patent Literature 3: JP-A 2009-186785
Patent Literature 4: JP-A 2009-184974
Patent Literature 5: JP-A 2009-86260
Patent Literature 6: JP-T 2002-536529

Non-Patent Literature

NPL 1: D. J. Broer, G. N. Mol, J. A. M. M. Van Haaren, and J. Lub. Adv. Mater., 1999, 11, 573

SUMMARY OF INVENTION

However, the polymerizable liquid crystal (II) has an extremely high crystallinity, and therefore has a problem in that the polymerizable liquid crystal (II) alone or a composition containing the polymerizable liquid crystal (II) readily crystallizes in a coating process (for example, see Patent Literature 4). Consequently, it is desired to develop an additive effective for preventing the polymerizable liquid crystal (II) from crystallizing.

For preventing the polymerizable liquid crystal (II) from crystallizing, not interfering with the properties thereof, in general, it is considered to be desirable to provide a liquid-crystal material as the additive. For example, in Patent Literatures 2 to 4, used is a composition in which the polymerizable liquid crystal (II) is combined with a (meth)acrylate compound having two (meth)acryloyl groups at the terminals of the molecule; and in Patent Literature 6, used is a composition prepared as a random mixture having a (meth)acryloyl group and an alkyl group at both terminals of the molecule, in preparing the polymerizable liquid crystal (II). However, the compositions described in these references are not satisfactory from the viewpoint of preventing crystal deposition after coating.

An object of the invention for solving the above problems is to provide a polymerizable liquid-crystal compound that is effective as an additive for preventing crystal deposition after coating with the polymerizable liquid crystal (II) or with a polymerizable liquid crystal similar thereto.

[Chem. 2]

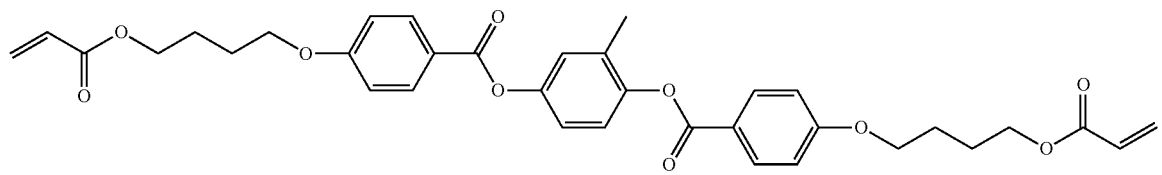

(II)

The present inventors have made assiduous studies and, as a result, have found that the problems in the prior art can be solved by employing a compound having a specific structure. Specifically, as a means for solving the problems, the inventors have provided the invention described below.

[1] A polymerizable liquid-crystal compound represented by the following general formula (I):

[Chem. 3]
General Formula (I)

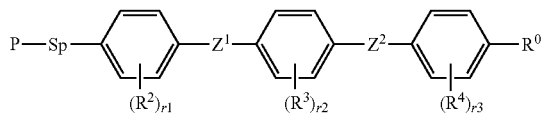

[In the formula, P represents a polymerizable functional group selected from the groups of the following formulae (P-1) to (P-5) (in the formulae, $R^{11}$ to $R^{13}$ each represent a hydrogen atom or a methyl group);

[Chem. 4]

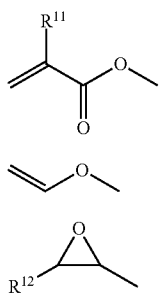

Sp represents a spacer or a single bond;
$Z^1$ and $Z^2$ each represent —CO—O—;
$R^0$ represents a linear alkyl group having from 1 to 15 carbon atoms;
$R^2$, $R^3$ and $R^4$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
$r_1$, $r_2$ and $r_3$ each independently indicate an integer of from 0 to 4; when $r_1$, $r_2$ and $r_3$ each are 2 or more, then $R^2$, $R^3$ and $R^4$ each may be the same or different; however, when $R^0$ is a methyl group, then $r_2$ is not 1.]

[2] Preferably, in the polymerizable liquid-crystal compound according to [1], the spacer to be represented by Sp in the general formula (I) is a linking group represented by the following general formula (Sp-1):

[Chem. 5]

$$—(R^{41}—Z^{41})_m—\qquad \text{General Formula (Sp-1)}$$

[In the formula, $R^{41}$ represents a substituted or unsubstituted alkylene group, a substituted or unsubstituted alkenylene group, or a substituted or unsubstituted alkynylene group. $Z^{41}$ represents —O—, —S—, —CO—, —CO—O—, —O—CO—, —S—CO—, —CO—S—, —O—CO—O—, —CO—NR$^{51}$—, —NR$^{51}$—CO—, —CR$^{51}$=N—, —N=CR$^{51}$— or a single bond ($R^{51}$ represents a hydrogen atom or an alkyl group having from 1 to 12 carbon atoms). m indicates an integer of from 1 to 6; when m is an integer of 2 or more, then multiple $R^{41}$'s in Sp may be the same or different, and multiple $Z^{41}$'s in Sp may be the same or different.]

[3] A polymerizable composition containing at least one polymerizable liquid-crystal compound of [1] or [2].

[4] Preferably, the polymerizable composition according to [3] contains a polymerizable liquid-crystal compound represented by the following general formula (II):

[Chem. 6]

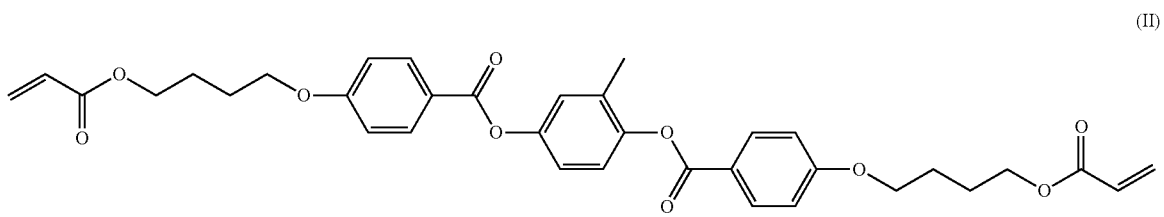

-continued

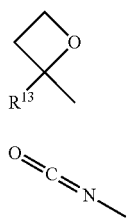

[5] Preferably, the polymerizable liquid-crystal composition according to [4] contains the polymerizable liquid-crystal compound represented by the general formula (I) in a ratio of from 3 to 50% by mass relative to the polymerizable liquid-crystal compound represented by the general formula (II).

[6] Preferably, the polymerizable liquid-crystal composition according to [4] contains the polymerizable liquid-crystal compound represented by the general formula (I) in a ratio of from 5 to 40% by mass relative to the polymerizable liquid-crystal compound represented by the general formula (II).

[7] Preferably, the polymerizable composition according to [3] to [6] further contains at least one polymerization initiator.

[8] Preferably, the polymerizable composition according to any one of [3] to [7] further contains at least one chiral compound.

[9] A method for producing a polymer material, which comprises a step of polymerizing the polymerizable liquid-crystal compound of [1] or [2], or polymerizing the polymerizable composition of any one of [3] to [8].

[10] Preferably, in the method for producing a polymer material according to [9], the polymerization is attained through irradiation with UV rays.

[11] A polymer material produced by polymerizing the polymerizable liquid-crystal compound of [1] or [2], or polymerizing the polymerizable composition of any one of [3] to [8].

[12] A film containing at least one polymer material of [11].

[13] A film produced by fixing the cholesteric liquid-crystal phase of the polymerizable composition of [8].

[14] Preferably, the film according to [12] or [13] exhibits optical anisotropy.

[15] Preferably, the film according to any one of [12] to [14] exhibits a selective reflection characteristic.

[16] Preferably, the film according to any one of [12] to [15] exhibits a selective reflection characteristic in an IR wavelength range.

The polymerizable liquid-crystal compound of the invention is effective for preventing crystal deposition after coating with the polymerizable liquid crystal (II) or a polymerizable liquid crystal similar thereto. The compound is effective for preventing crystal deposition of the widely-versatile polymerizable liquid crystal (II), and therefore the polymerizable liquid crystal (II) alone, or the polymerizable composition, the polymer material and the film comprising the polymerizable liquid crystal (II) can be used in various applications.

DESCRIPTION OF EMBODIMENTS

The invention is described in detail hereinunder.

The description of the constitutive elements of the invention given hereinunder may be for some typical embodiments or concrete examples of the invention, to which, however, the invention should not be limited. In this description, the numerical range expressed by the wording "a number to another number" means the range that falls between the former number indicating the lower limit of the range and the latter number indicating the upper limit thereof.

1. Polymerizable Liquid-Crystal Compound

The invention relates to the polymerizable liquid-crystal compound represented by the following general formula (I).

The polymerizable liquid-crystal compound represented by the following general formula (I) is characterized in that $R^1$ represents a linear alkyl group having from 1 to 15 carbon atoms, and $Z^1$ and $Z^2$ in the mesogen each are a group —CO—O—. The structure of the mesogen in which $Z^1$ and $Z^2$ each are a group —CO—O— differs from the linking chain of the mesogen in the polymerizable liquid-crystal compound (II) where the group —CO—O— and the group —O—CO— bond to the phenylene group in that order. Consequently, the structure of the compound of the present invention differs from that of the compound to be formed in synthesis of a random mixture that contains the polymerizable liquid-crystal compound (II), as described in JP-T2002-536529. According to the method described in JP-T 2002-536529, the compound represented by the following general formula (I) could not be obtained. In addition, the compound represented by the general formula (I) has good solubility in solvents and has good miscibility with other liquid-crystal materials, and can be cured by polymerization, and therefore, the compound is useful in various applications such as optical members, etc.

[Chem. 7]

$$P—Sp—\phenyl(R^2)_{r1}—Z^1—\phenyl(R^3)_{r2}—Z^2—\phenyl(R^4)_{r3}—R^0 \quad (I)$$

(Structure of Polymerizable Liquid-Crystal Compound Represented by General Formula (I))

In the general formula (I), P represents a polymerizable functional group selected from the groups of the following formulae (P-1) to (P-5). Here the polymerizable functional group is a concept that comprises a group directly participating in polymerization (for example, $CH_2=CH—$) alone, or comprises both a group directly participating in polymerization (for example, $CH_2=CH—$) and a functional group bonding thereto (for example, —CO—, —CO—O—, —O—). As the polymerizable functional group, preferred is a radical-polymerizable or cationic-polymerizable functional group.

Of the polymerizable functional groups represented by the following formulae (P-1) to (P-5), preferably, P is the polymerizable functional group of (P-1).

[Chem. 8]

(P-1)
(P-2)
(P-3)
(P-4)
(P-5)

In the above formulae (P-1) to (P-5), $R^{11}$ to $R^{13}$ each represent a hydrogen atom or a methyl group, preferably a hydrogen atom.

In the general formula (I), Sp represents a spacer or a single bond. Here the spacer is a linking group having a structure represented by the following general formula (Sp-1), and Sp is preferably the linking group represented by the general formula (Sp-1).

[Chem. 9]

$$—(R^{41}—Z^{41})_m— \qquad \text{General Formula (Sp-1)}$$

[In the formula, $R^{41}$ represents a substituted or unsubstituted alkylene group, a substituted or unsubstituted alkenylene group, or a substituted or unsubstituted alkynylene group. $Z^{41}$ represents —O—, —S—, —CO—, —CO—O—, —O—CO—, —S—CO—, —CO—S—, —O—CO—O—, —CO—NR$^{51}$—, —NR$^{51}$—CO—, —CR$^{51}$=N—, —N=CR$^{51}$— or a single bond ($R^{51}$ represents a hydrogen atom or an alkyl group having from 1 to 12 carbon atoms). m indicates an integer of from 1 to 6; when m is an integer of 2 or more, then multiple $R^{41}$'s in Sp may be the same or different, and multiple $Z^{41}$'s in Sp may be the same or different.]

In the above general formula (Sp-1), $R^{41}$ represents a substituted or unsubstituted alkylene group, a substituted or unsubstituted alkenylene group, or a substituted or unsubstituted alkynylene group. The alkylene group may be linear or branched, but is preferably linear. Preferably, the carbon number of the alkylene group is from 1 to 12, more preferably from 2 to 8, even more preferably from 2 to 6. The alkenylene group and the alkynylene group each may be linear or branched, but preferably linear. The carbon number of the alkenylene group and the alkynylene group is preferably from 2 to 12, more preferably from 2 to 8, even more preferably from 2 to 6. The substituent which the alkylene group, the alkenylene group and the alkynylene group may have includes, for example, a fluorine atom, a chlorine atom, a cyano group, an alkoxy group having from 1 to 4 carbon atoms, etc. The alkoxy group may be linear or branched, including, for example, a methoxy group and an ethoxy group. Preferably, $R^{41}$ is a substituted or unsubstituted alkylene group, more preferably an unsubstituted alkylene group, even more preferably an unsubstituted alkylene group having from 2 to 8 carbon atoms, still more preferably an unsubstituted alkylene group having from 2 to 6 carbon atoms.

In the above general formula (Sp-1), $Z^{41}$ represents —O—, —S—, —CO—, —CO—O—, —O—CO—, —S—CO—, —CO—S—, —O—CO—O—, —CO—NR$^{51}$—, —NR$^{51}$—CO—, —CR$^{51}$=N—, —N=CR$^{51}$— or a single bond. $R^{51}$ represents a hydrogen atom or an alkyl group having from 1 to 12 carbon atoms. The alkyl group for $R^{51}$ may be linear or branched, but preferably has from 1 to 6 carbon atoms, more preferably from 1 to 4 carbon atoms. For example, a methyl group and an ethyl group are employable here. The alkyl group may be substituted. When the alkyl group is substituted, the substituent includes, for example, a fluorine atom, a chlorine atom, and a cyano group. $R^{51}$ is preferably a hydrogen atom or an alkyl group having from 1 to 4 carbon atoms, more preferably a hydrogen atom or a methyl group, even more preferably a hydrogen atom. $Z^{41}$ is preferably —O—, —S—, —CO—, —CO—O—, —O—CO—, —S—CO— or —CO—S—, more preferably —O— or —S—.

In the above general formula (Sp-1), m indicates an integer of from 1 to 6, preferably an integer of from 1 to 4, more preferably an integer of from 1 to 3. When m is an integer of 2 or more, then multiple $R^{41}$'s in Sp may be the same or different, and multiple $Z^{41}$'s in Sp may be the same or different.

Preferably, Sp is a linking group that includes a substituted or unsubstituted alkyleneoxy group. For example, preferably employable here are an alkyleneoxy group, an alkyleneoxyalkyleneoxy group, and an alkyleneoxyalkyleneoxyalkyleneoxy group. Of those, Sp is more preferably an alkyleneoxy group.

In the general formula (I), $Z^1$ and $Z^2$ each represent —CO—O—.

In the general formula (I), $R^0$ represents a linear alkyl group having from 1 to 15 carbon atoms. Preferably, the carbon number of $R^0$ is from 1 to 10, more preferably from 1 to 8, even more preferably from 1 to 5. For example, employable here are a methyl group and an ethyl group. The alkyl group may be substituted. When the alkyl group is substituted, the substituent includes, for example, a fluorine atom, a chlorine atom, and a cyano group.

In the above general formula (I), $R^2$, $R^3$ and $R^4$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom. Here the alkyl group, as well as the alkyl moiety in the alkoxy group, the alkoxycarbonyl group, the acyloxy group, the acyl group and the amide group may be linear or branched, and may have a substituent (preferably a halogen atom). For example, there are mentioned a methyl group, an ethyl group, and a trifluoromethyl group. The halogen atom includes a fluorine atom, a chlorine atom, a bromine atom, an iodine atom, and is preferably a fluorine atom, a chlorine atom or a bromine atom. Preferred examples of $R^2$, $R^3$ and $R^4$ include a methyl group, an ethyl group, a trifluoromethyl group, a methoxy group, an ethoxy group, a methoxycarbonyl group, an ethoxycarbonyl group, an acetyloxy group, a propionyloxy group, a methylamide group, an ethylamide group, a cyano group, a fluorine atom, a chlorine atom, and a bromine atom. Of those, more preferred are a methyl group, a methoxy group, a trifluoromethyl group, and a chlorine atom.

In the above general formula (I), $r_1$, $r_2$ and $r_3$ each independently indicate an integer of from 0 to 4. Preferably, $r_1$, $r_2$ and $r_3$ each are an integer of from 0 to 3, more preferably an integer of from 0 to 2. When $r_1$, $r_2$ and $r_3$ each are 2 or more, then $R^2$, $R^3$ and $R^4$ each may be the same or different. However, when $R^0$ is a methyl group, then $r_2$ is not 1. Further, $r_1$ and $r_3$ are more preferably 0. $r_2$ is more preferably 0 or 1, even more preferably 0.

Specific examples of the polymerizable liquid-crystal compound represented by the above general formula (I) are shown below. However, the scope of the polymerizable liquid-crystal compound represented by the above general formula (I) of the invention should not be limitatively interpreted by these specific examples.

[Chem. 10]

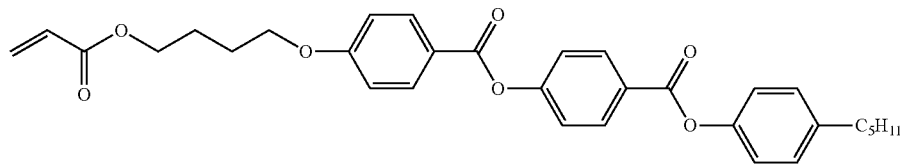

(I-1)

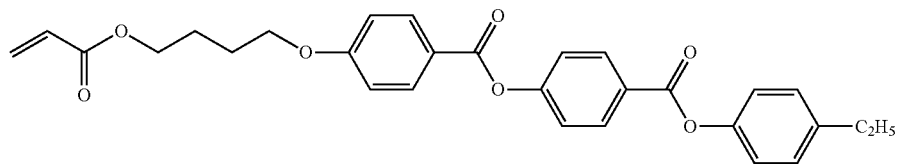
(I-2)
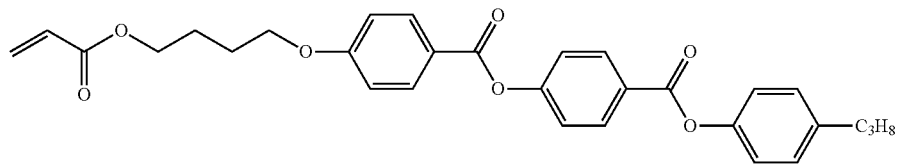
(I-3)
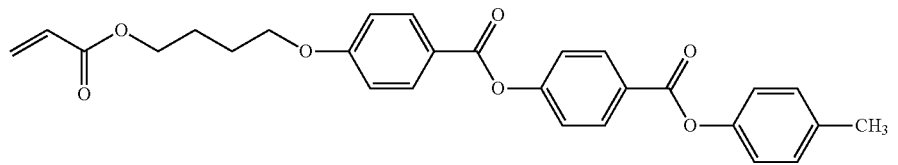
(I-4)
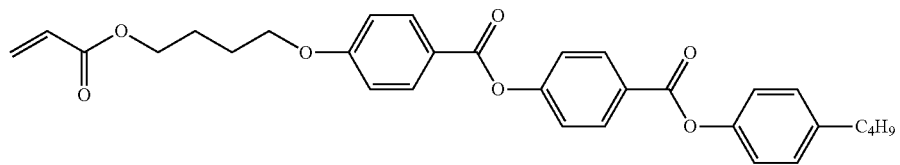
(I-5)
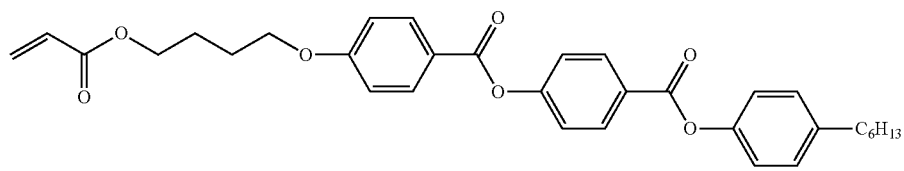
(I-6)
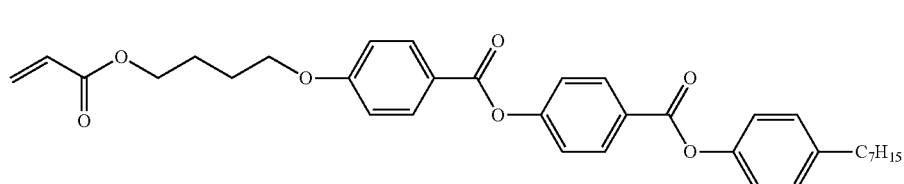
(I-7)
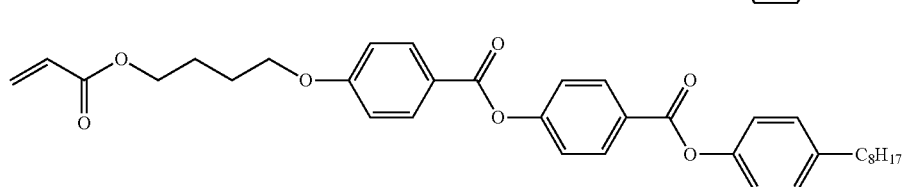
(I-8)
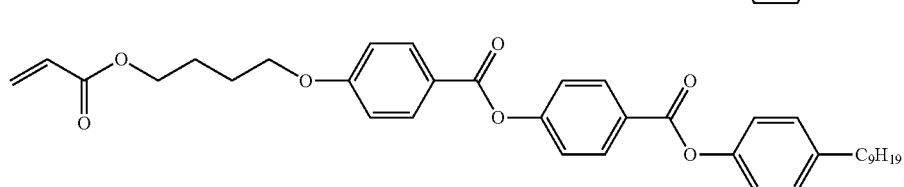
(I-9)
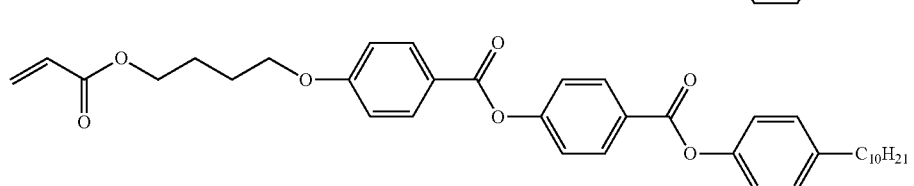
(I-10)

-continued
[Chem. 11]
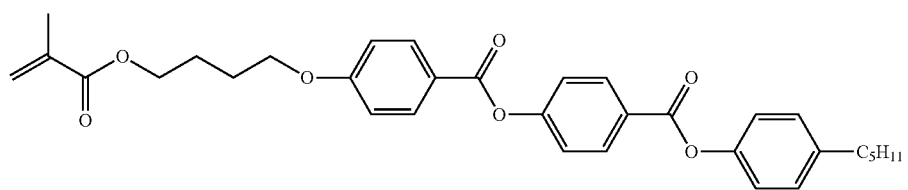 (I-11)
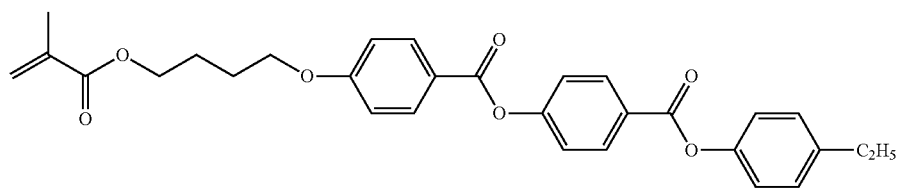 (I-12)
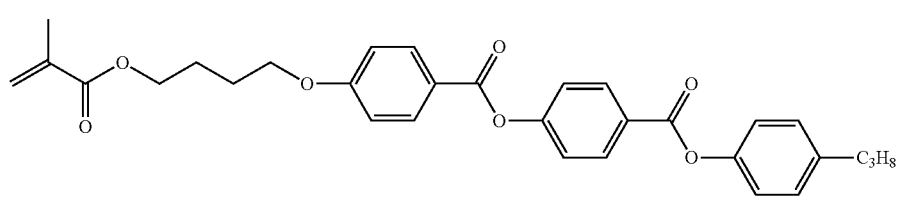 (I-13)
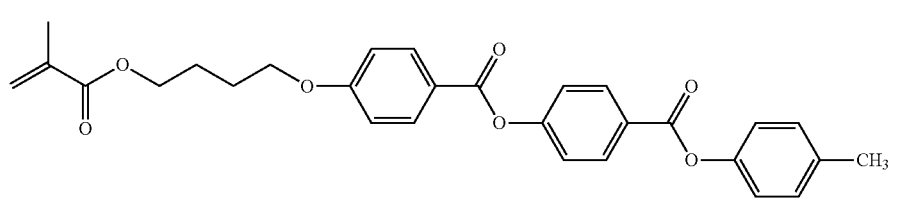 (I-14)
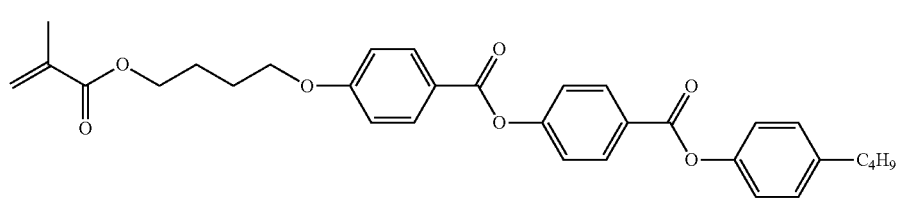 (I-15)
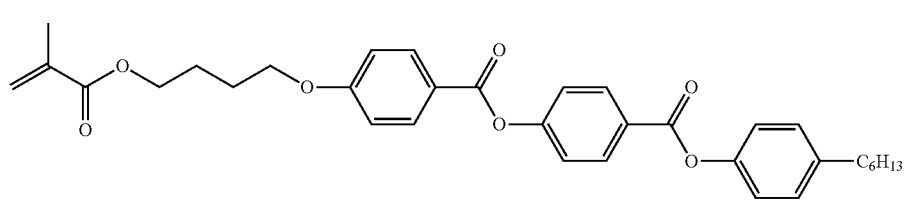 (I-16)
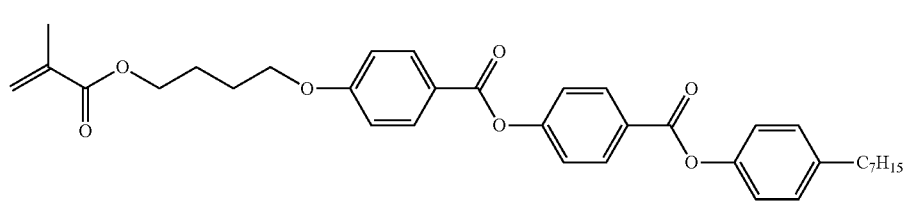 (I-17)
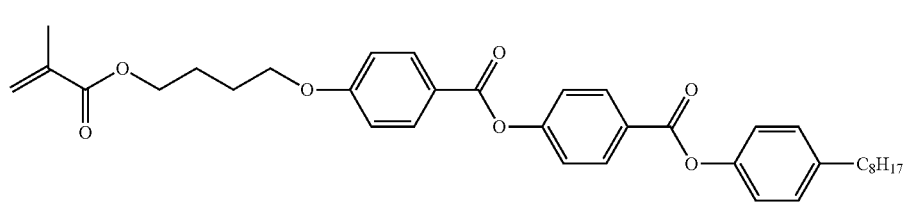 (I-18)

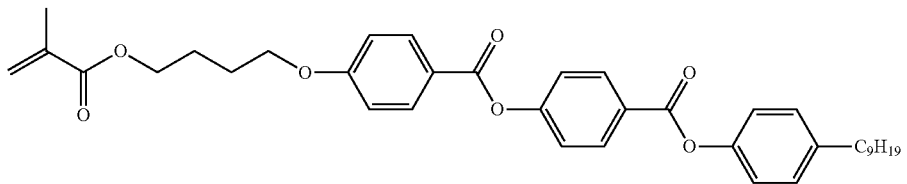
(I-19)
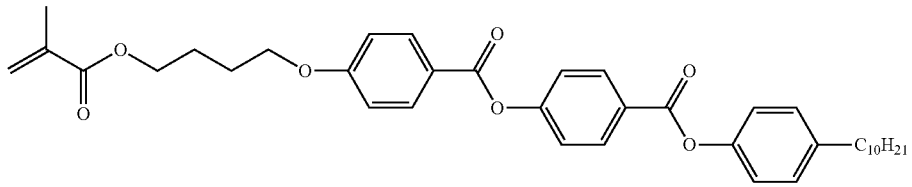
(I-20)
[Chem. 12]
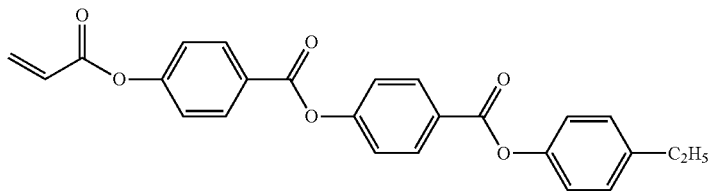
(I-21)
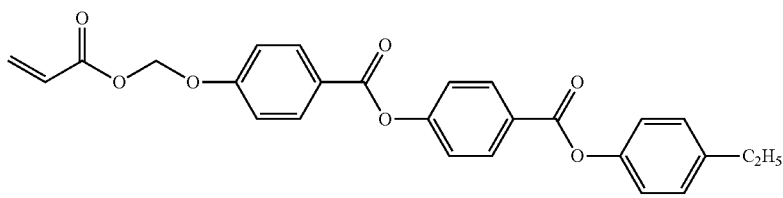
(I-22)
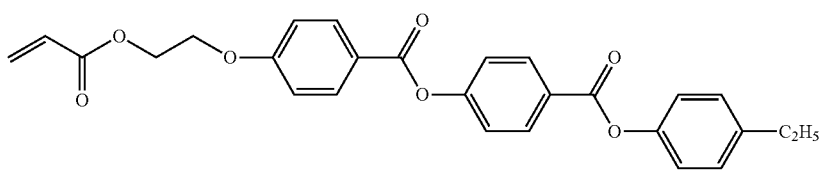
(I-23)
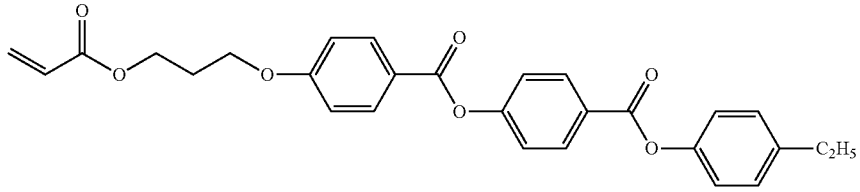
(I-24)
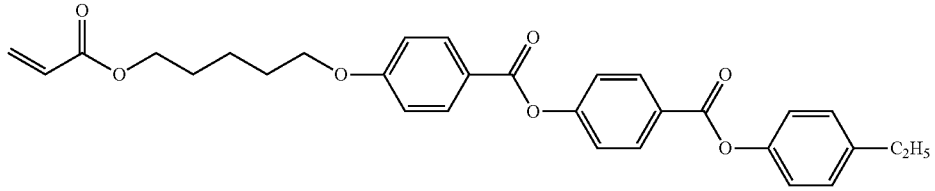
(I-25)
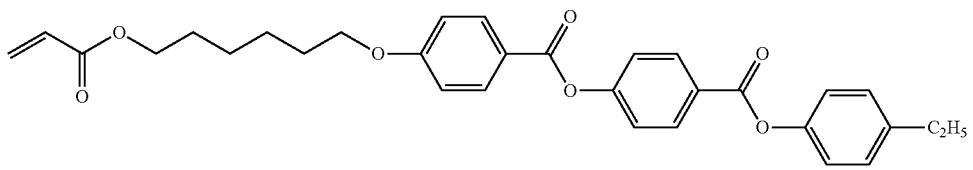
(I-26)

-continued
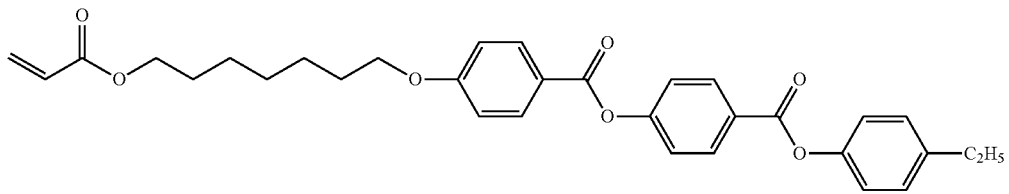
(I-27)
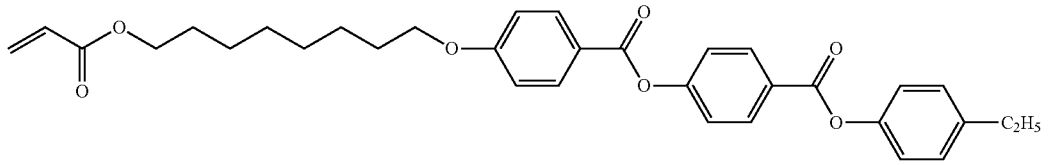
(I-28)
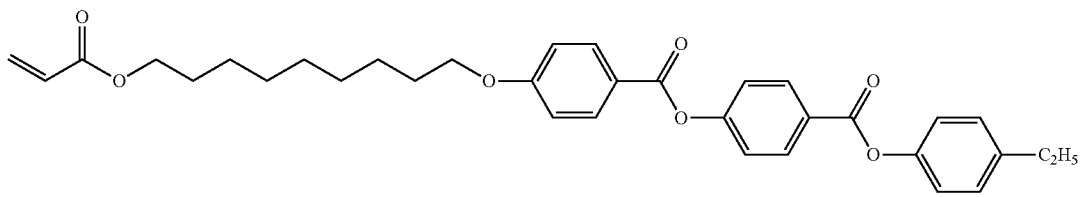
(I-29)
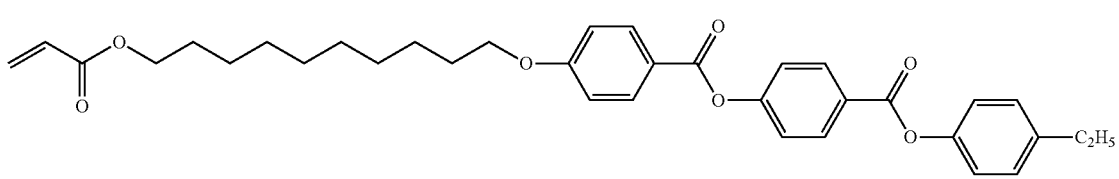
(I-30)
[Chem. 13]
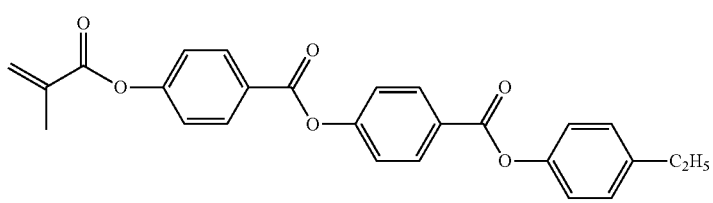
(I-31)
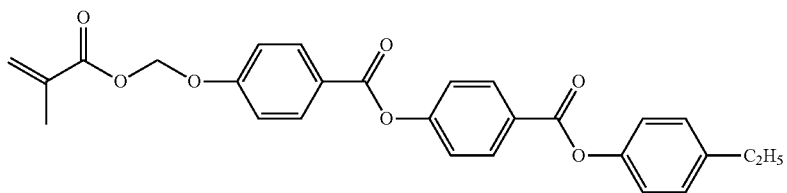
(I-32)
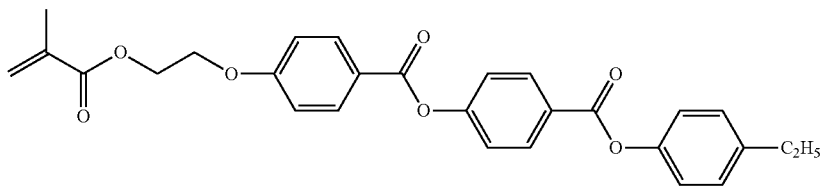
(I-33)
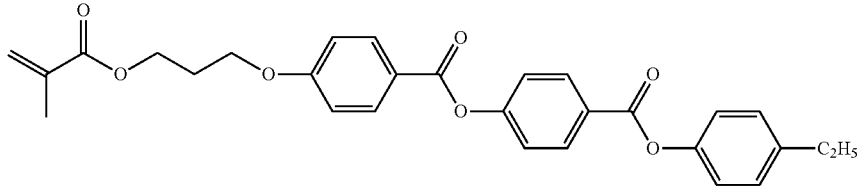
(I-34)

-continued
(I-35)
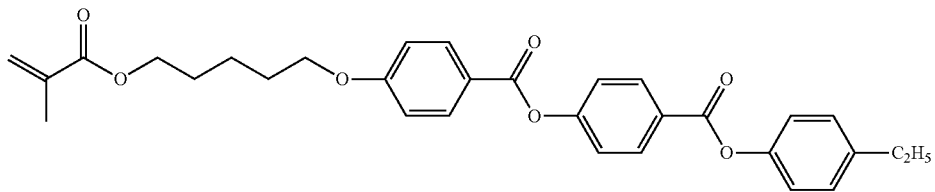
(I-36)
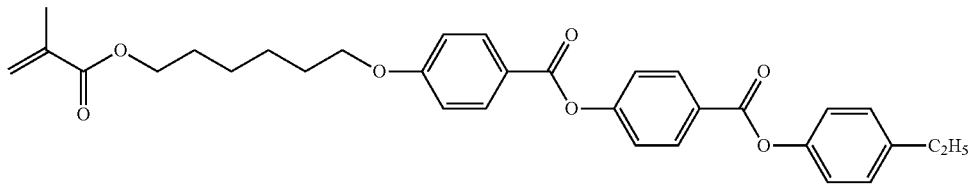
(I-37)
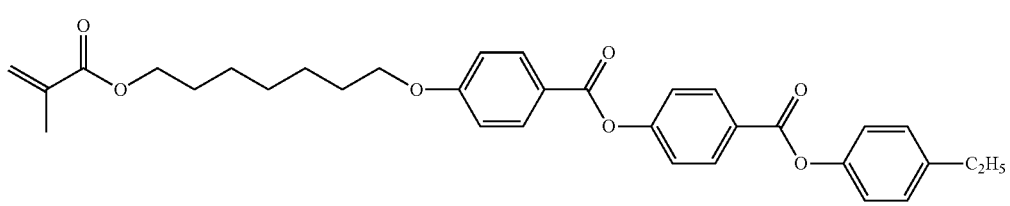
(I-38)
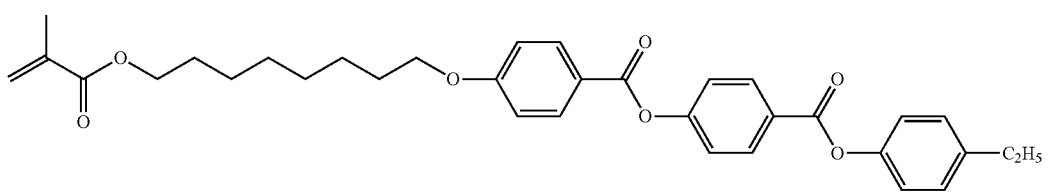
(I-39)
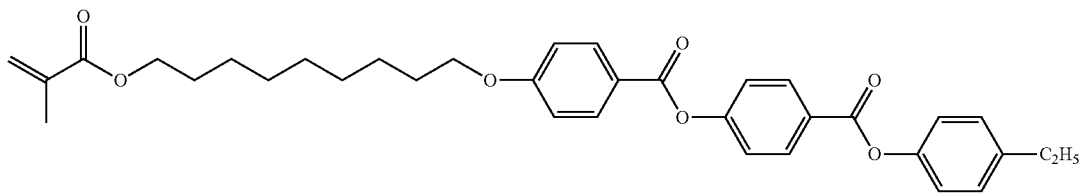
(I-40)
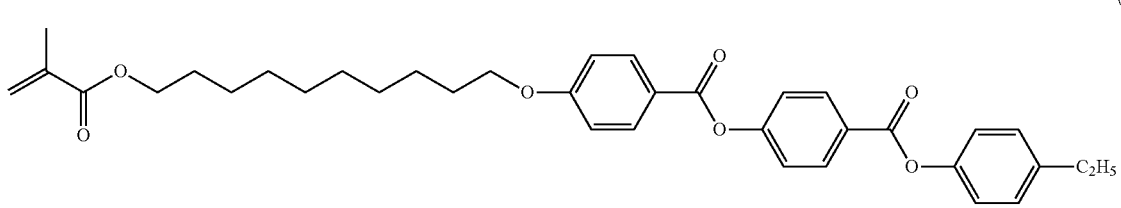
[Chem. 14]
(I-41)
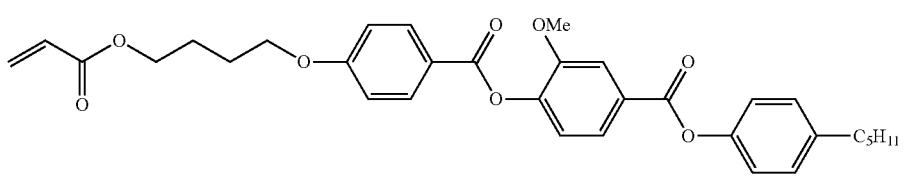
(I-42)
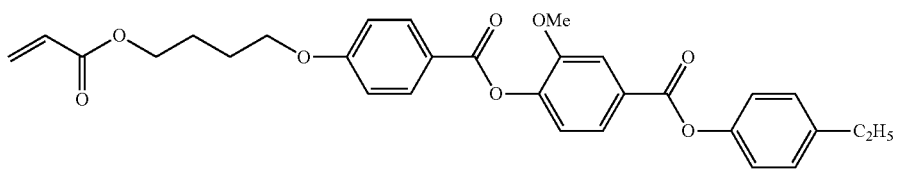

-continued
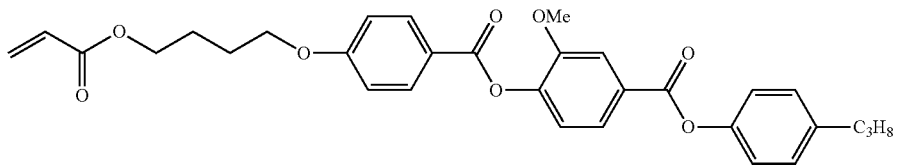
(I-43)
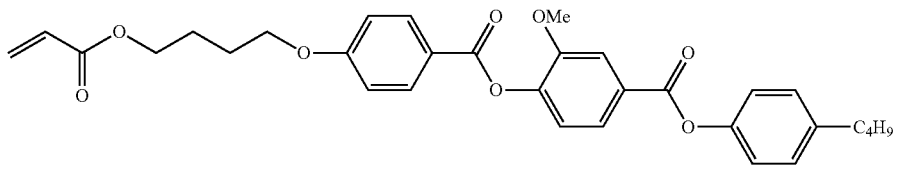
(I-45)
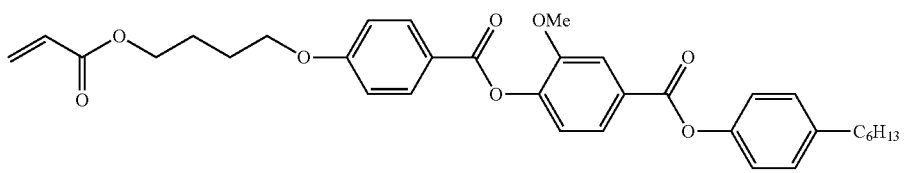
(I-46)
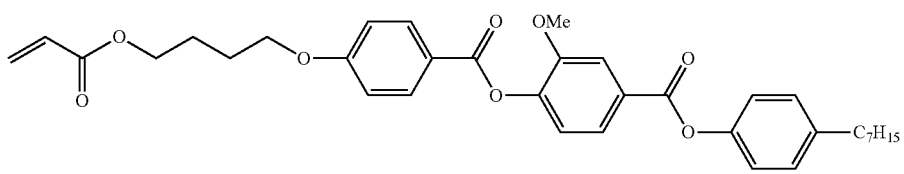
(I-47)
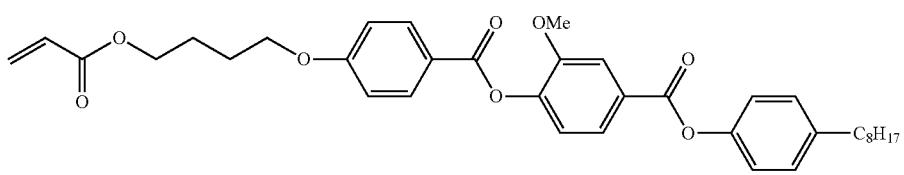
(I-48)
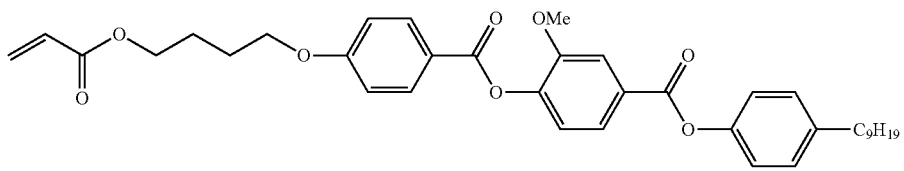
(I-49)
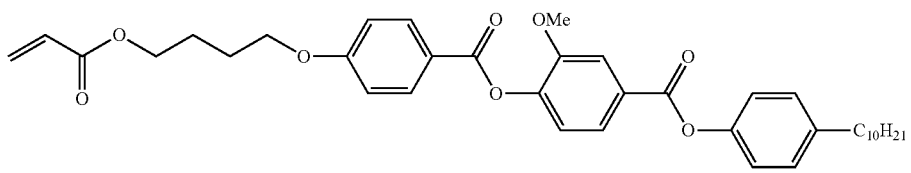
(I-50)
[Chem. 15]
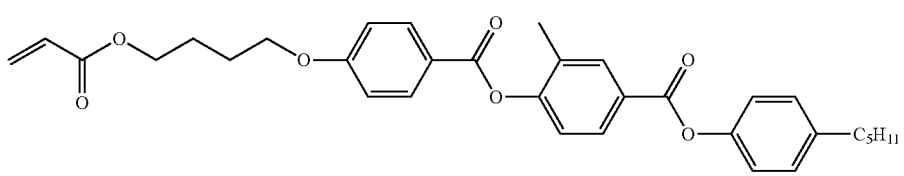
(I-51)

-continued
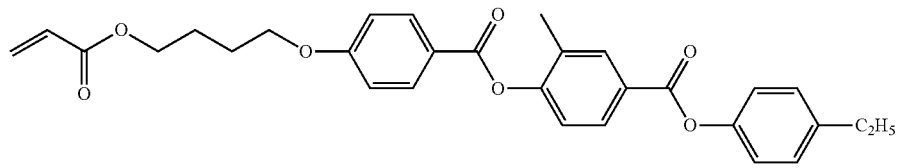
(I-52)
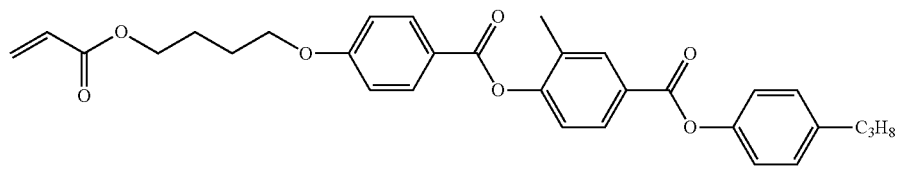
(I-53)
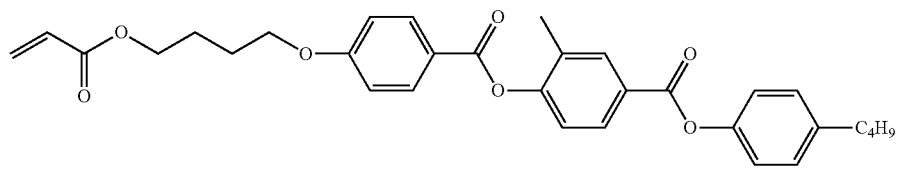
(I-55)
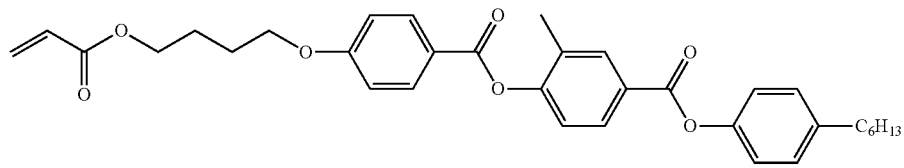
(I-56)
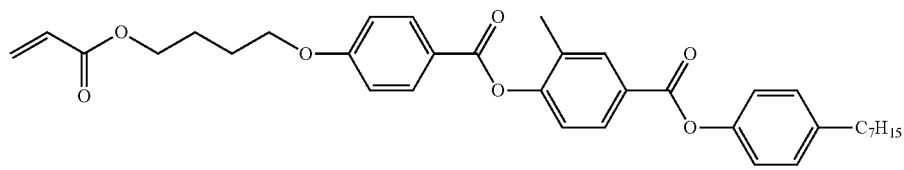
(I-57)
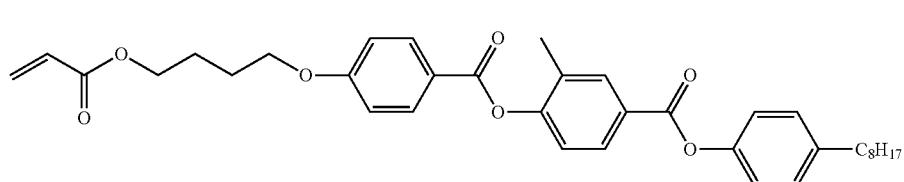
(I-58)
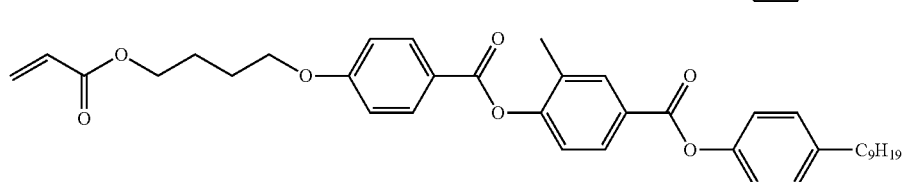
(I-59)
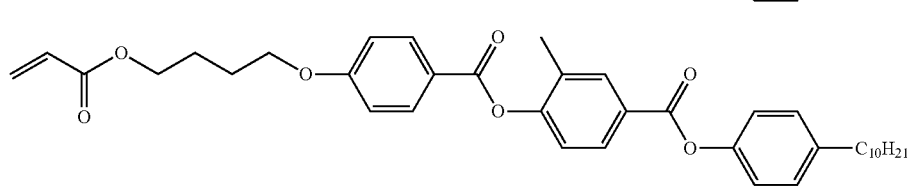
(I-60)
[Chem. 16]
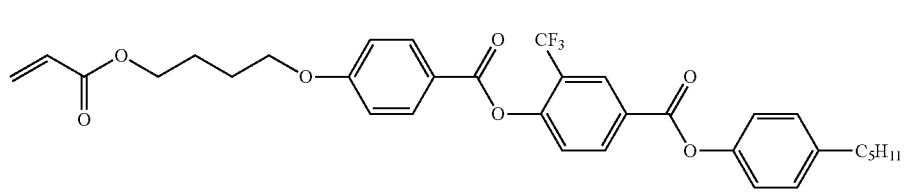
(I-61)

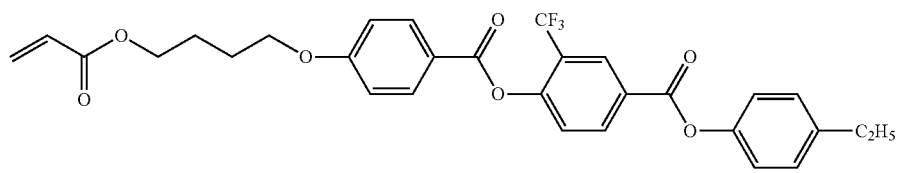
(I-62)
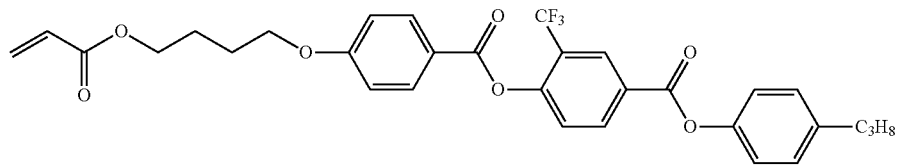
(I-63)
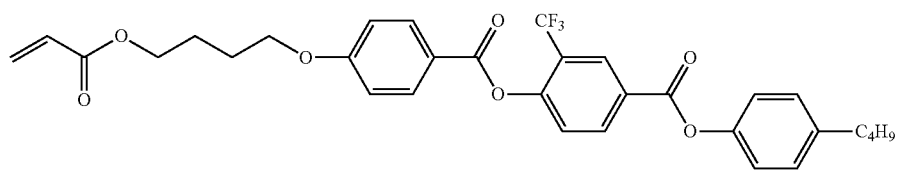
(I-65)
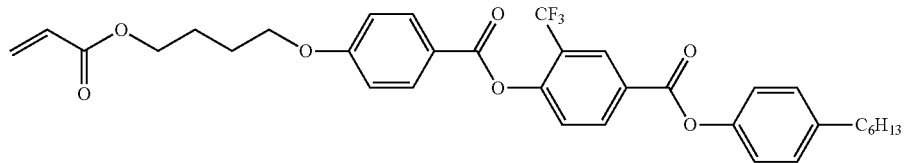
(I-66)
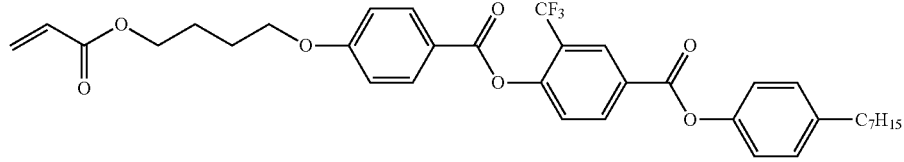
(I-67)
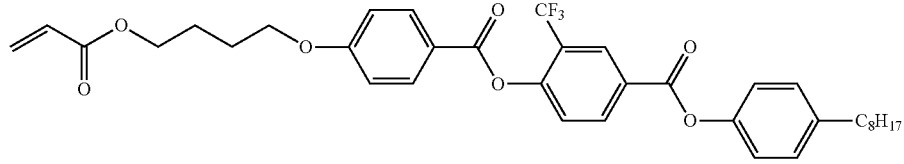
(I-68)
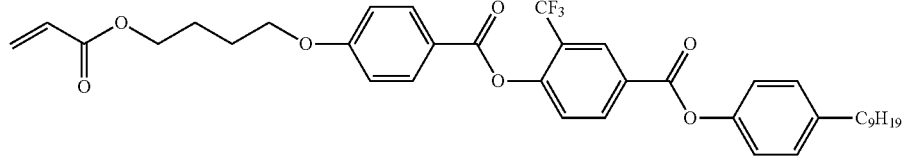
(I-69)
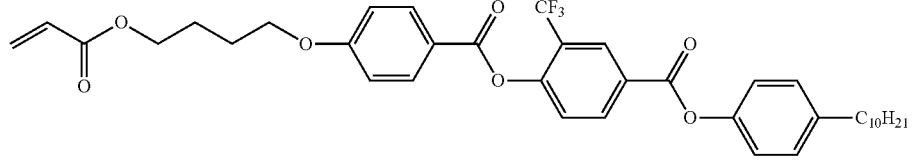
(I-70)

-continued
[Chem. 17]
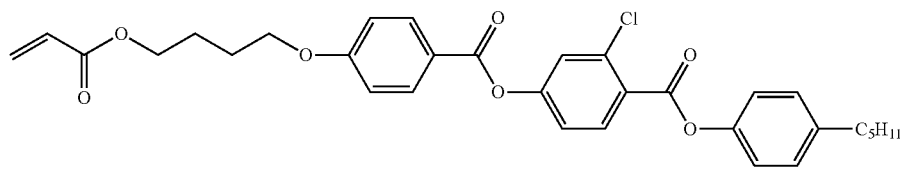
(I-71)
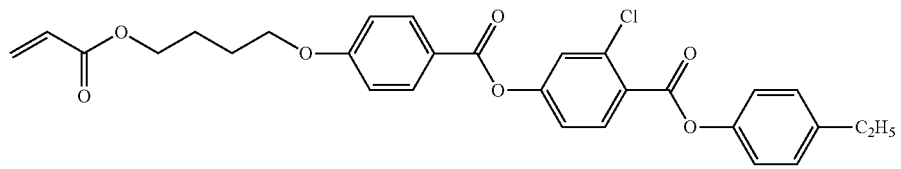
(I-72)
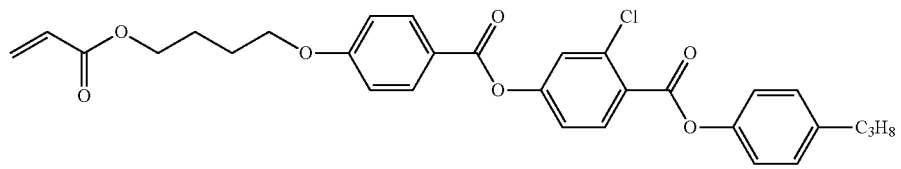
(I-73)
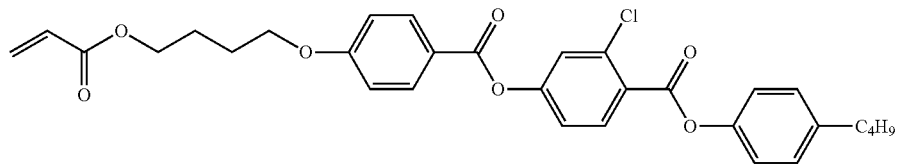
(I-75)
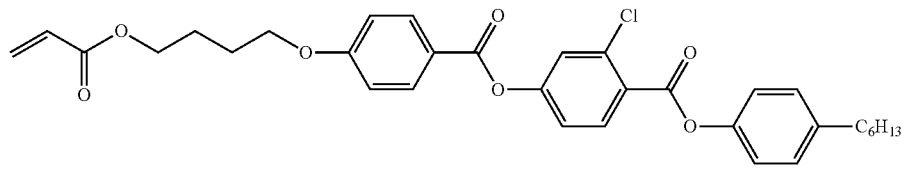
(I-76)
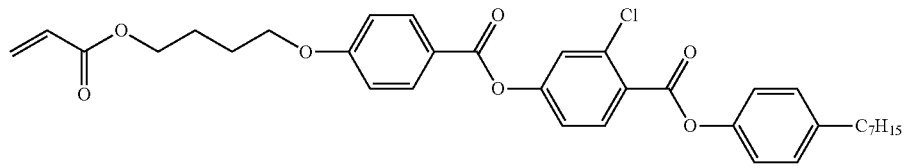
(I-77)
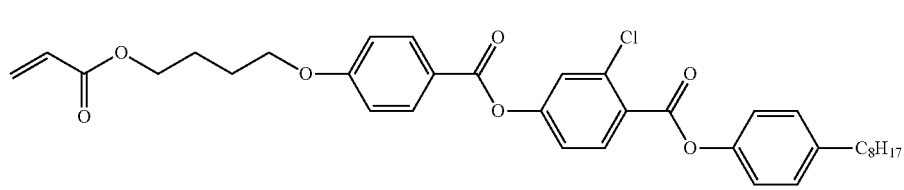
(I-78)
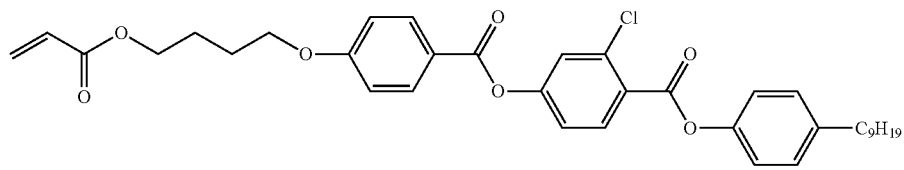
(I-79)

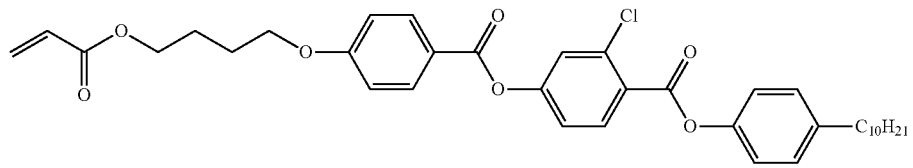
(I-80)
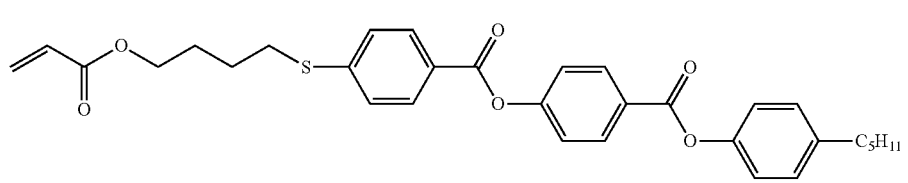
(I-81)
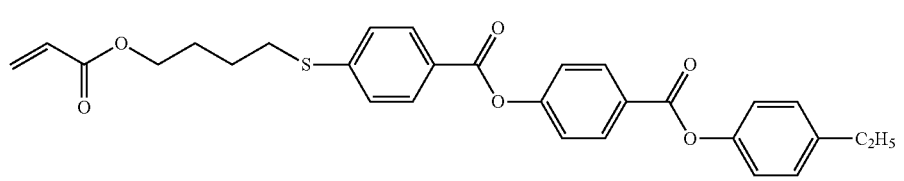
(I-82)
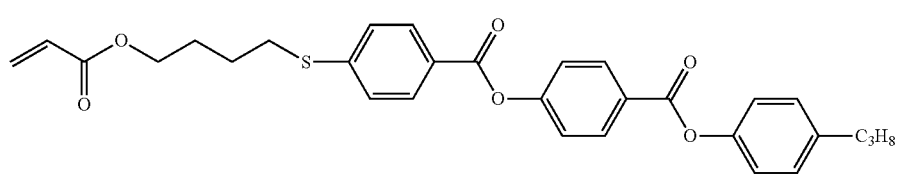
(I-83)
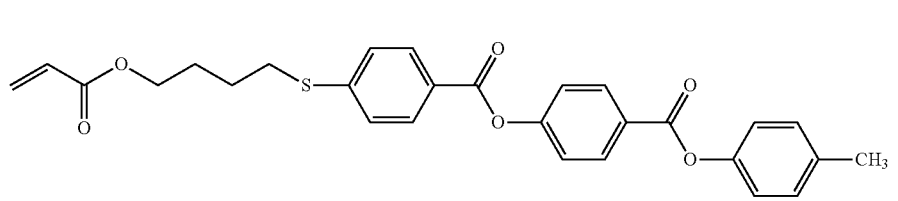
(I-84)
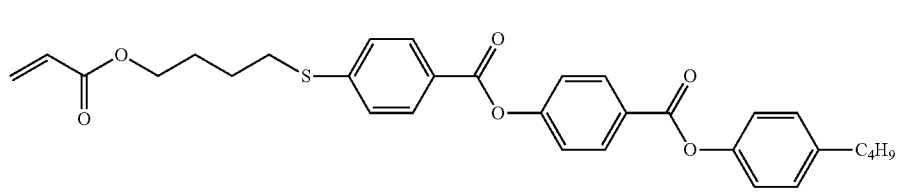
(I-85)
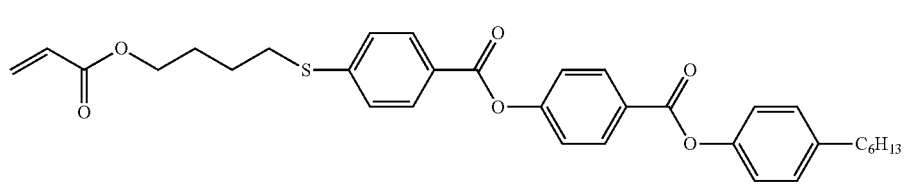
(I-86)
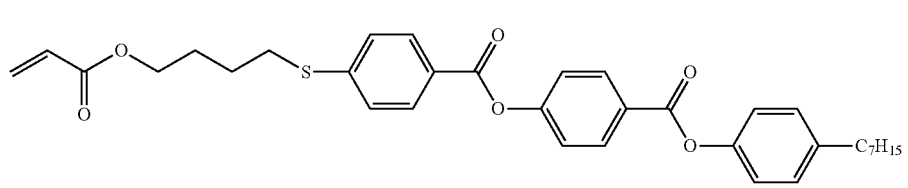
(I-87)

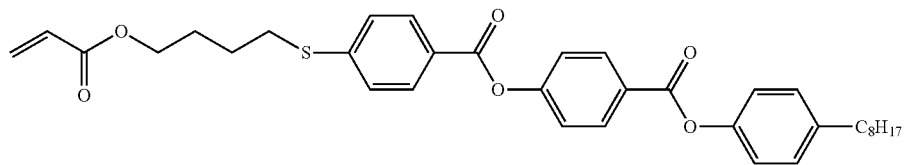
(I-88)
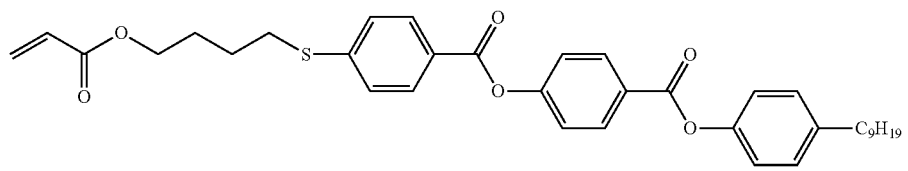
(I-89)
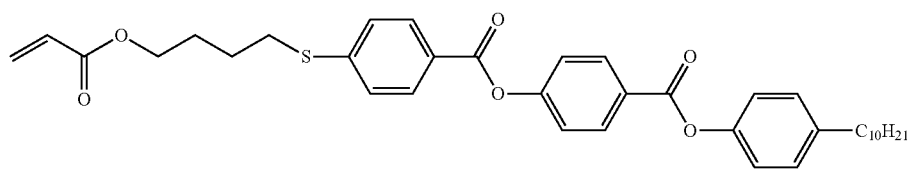
(I-90)
[Chem. 19]
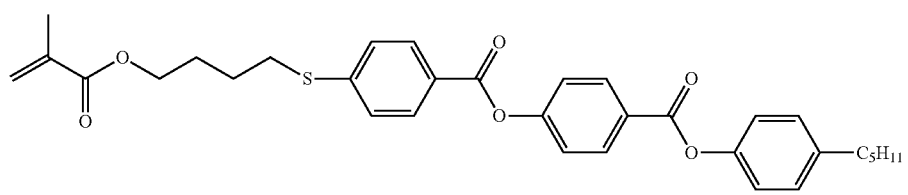
(I-91)
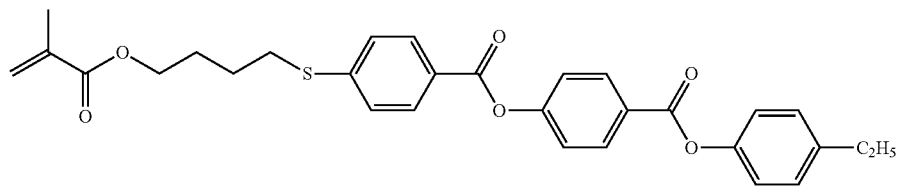
(I-92)
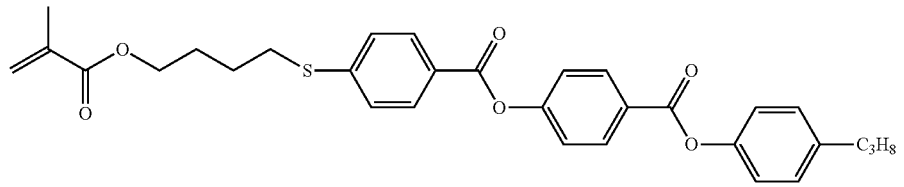
(I-93)
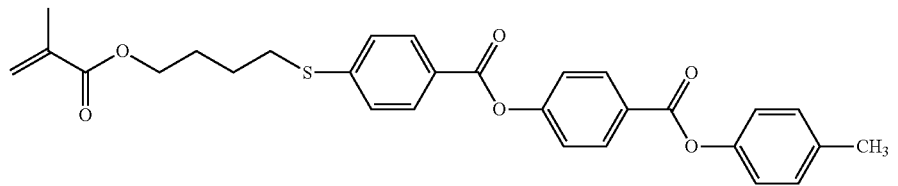
(I-94)
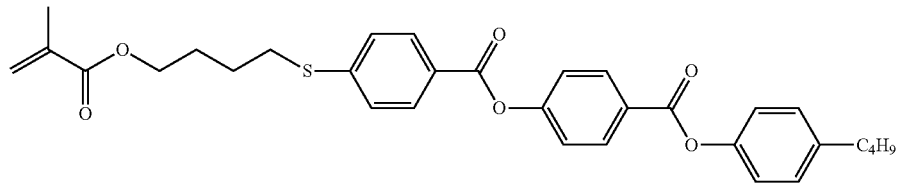
(I-95)

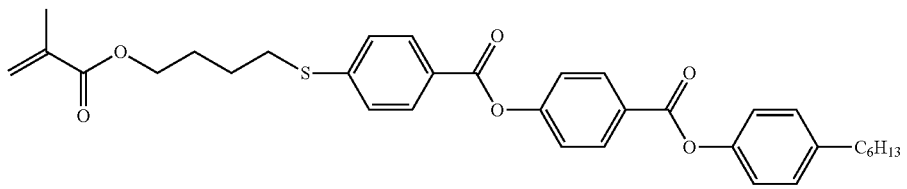
(I-96)
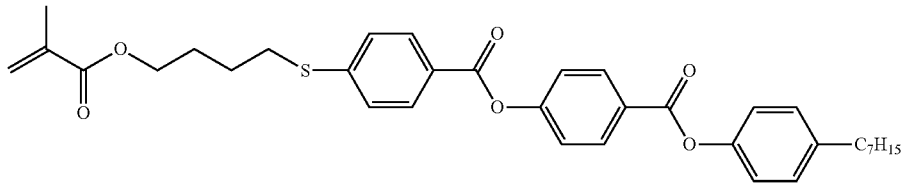
(I-97)
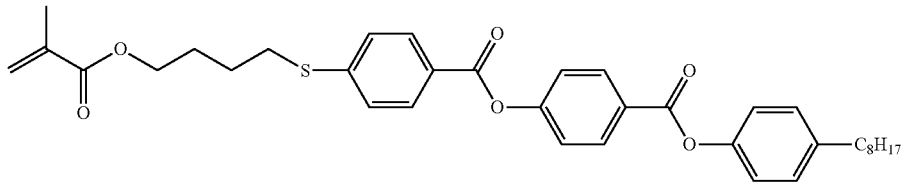
(I-98)
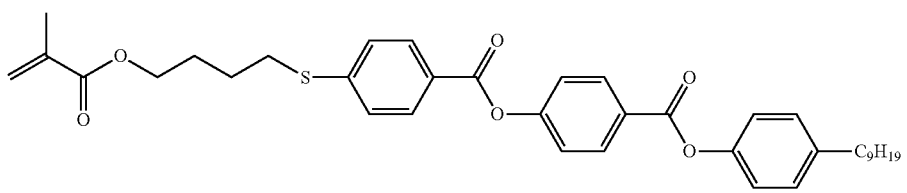
(I-99)
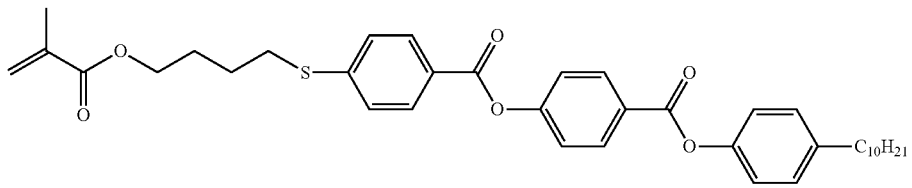
(I-100)
[Chem. 20]
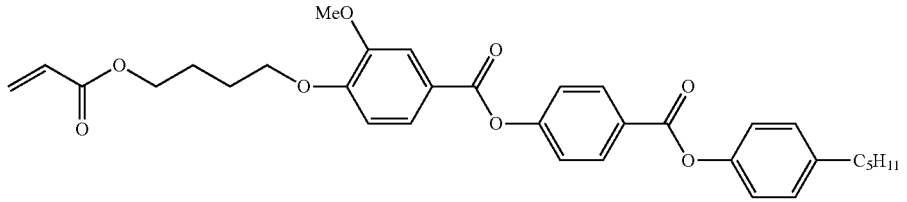
(I-101)
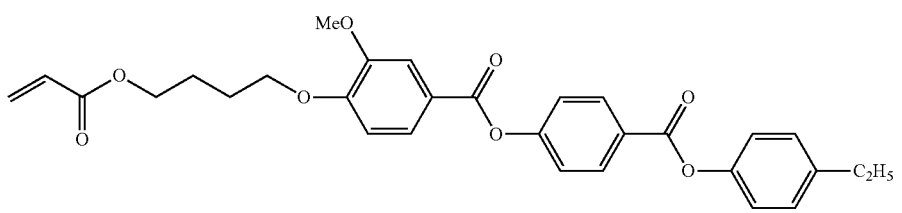
(I-102)

-continued
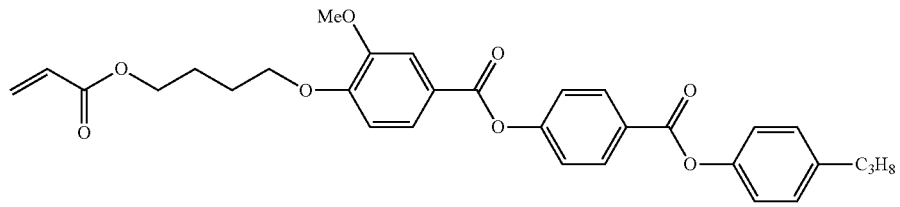
(I-103)
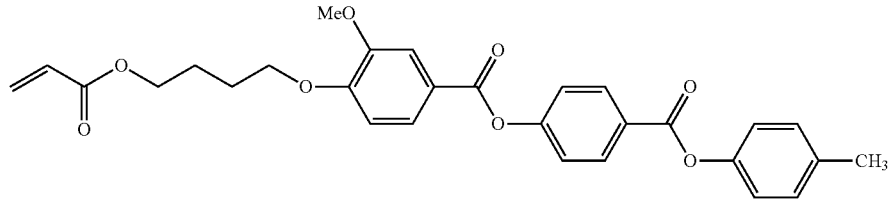
(I-104)
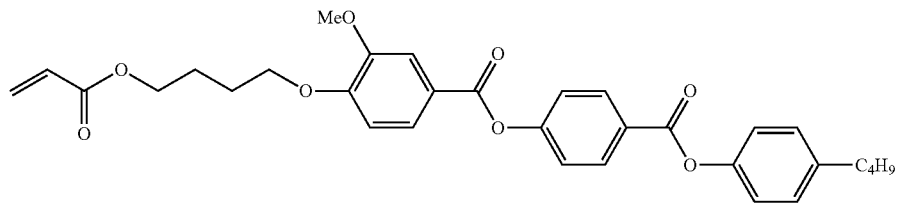
(I-105)
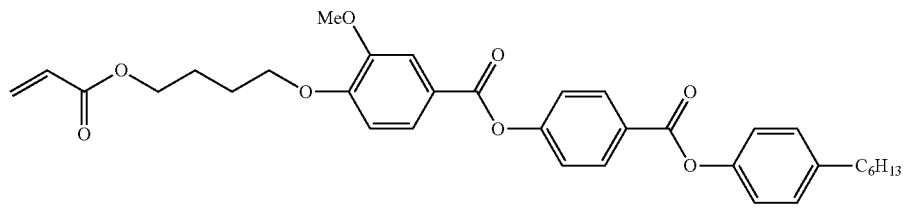
(I-106)
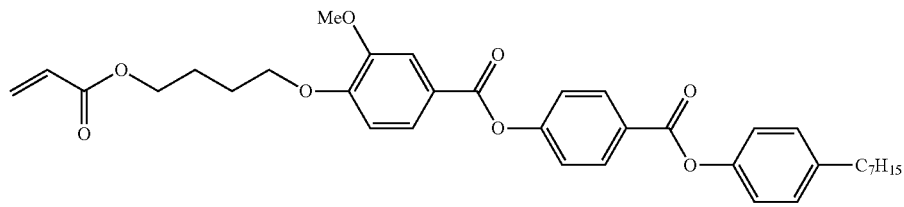
(I-107)
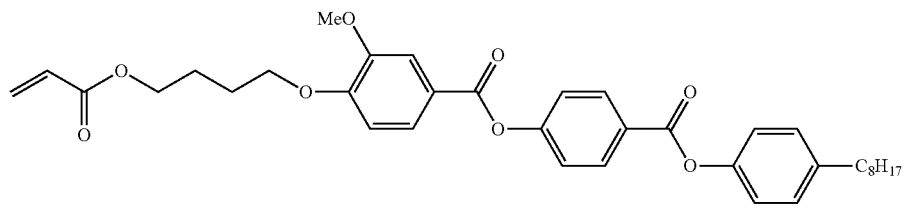
(I-108)
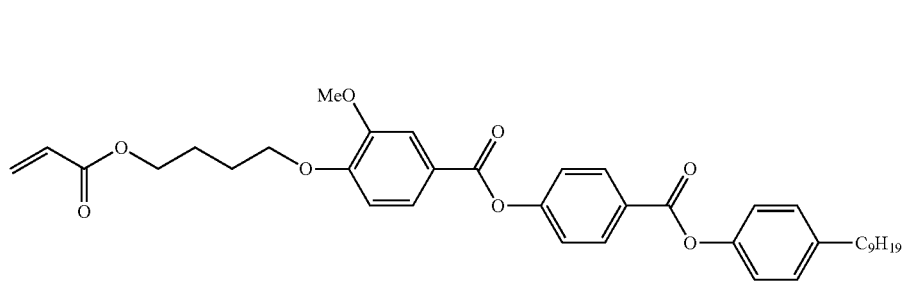
(I-109)

-continued
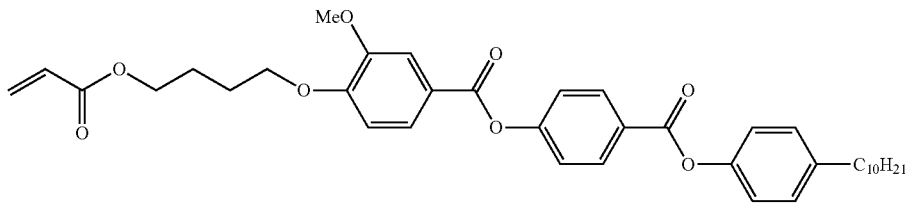
(I-110)
[Chem. 21]
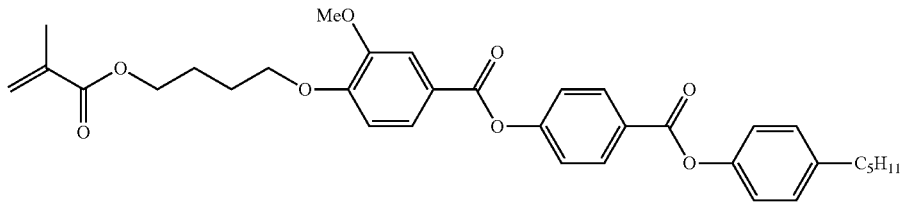
(I-111)
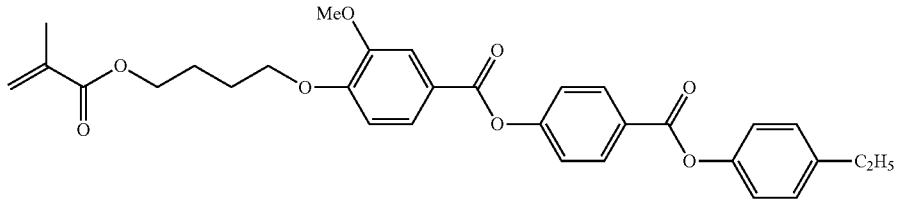
(I-112)
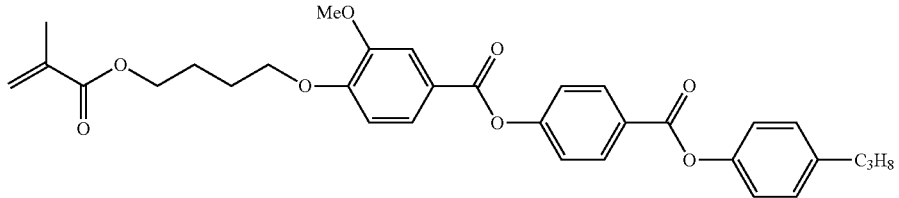
(I-113)
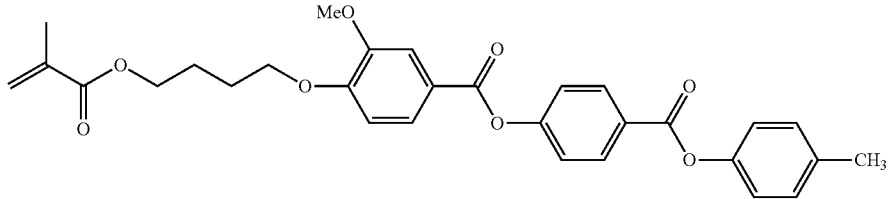
(I-114)
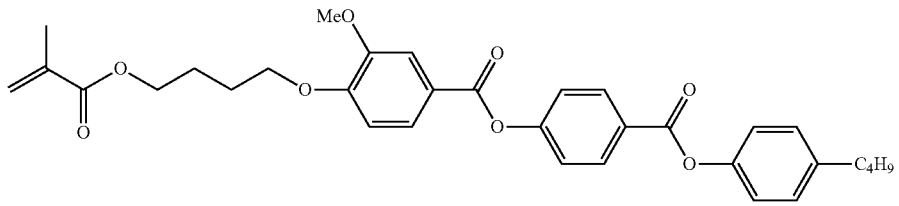
(I-115)
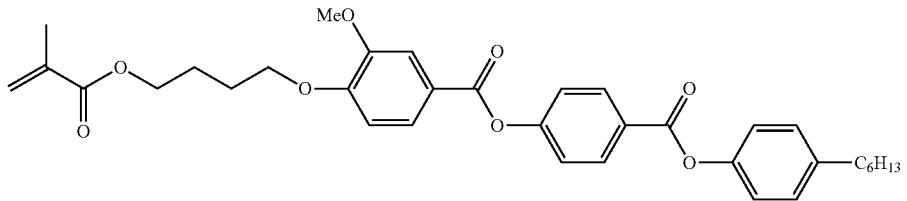
(I-116)

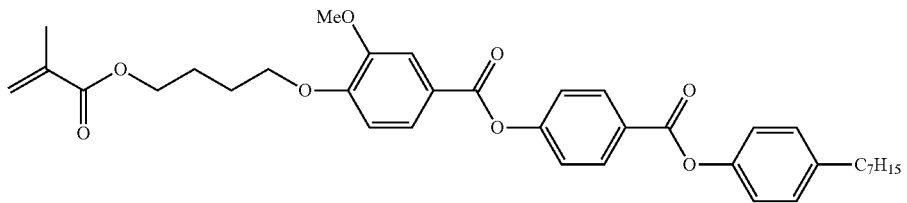
(I-117)
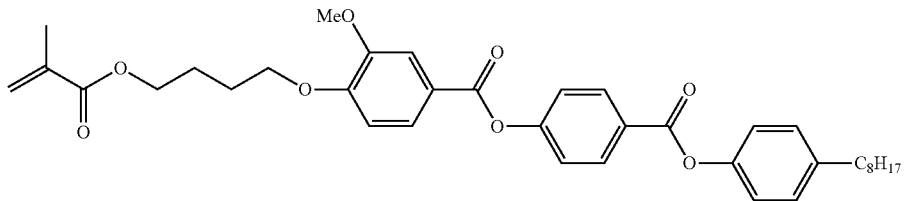
(I-118)
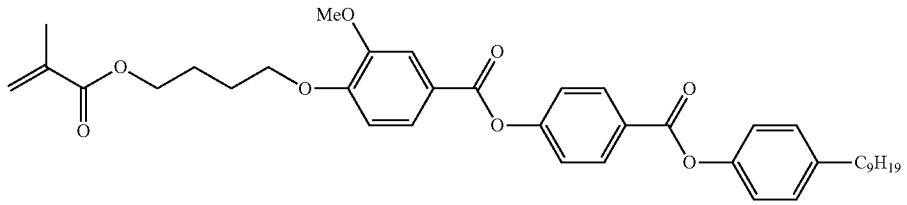
(I-119)
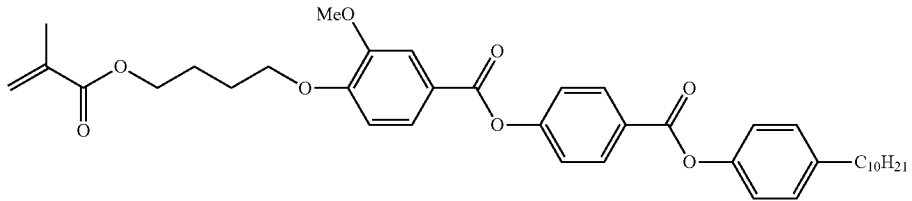
(I-120)
[Chem. 22]
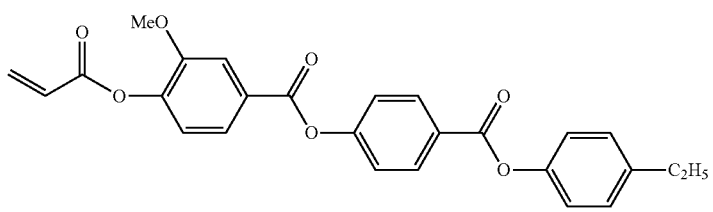
(I-121)
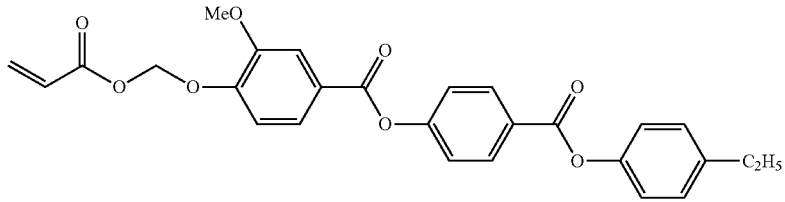
(I-122)
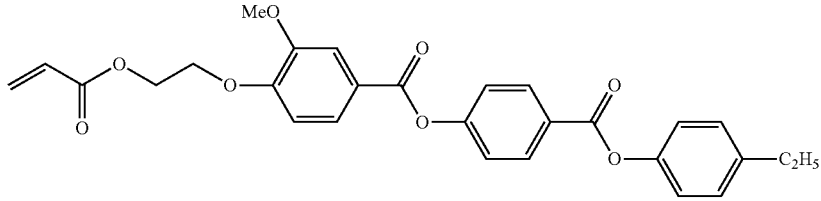
(I-123)

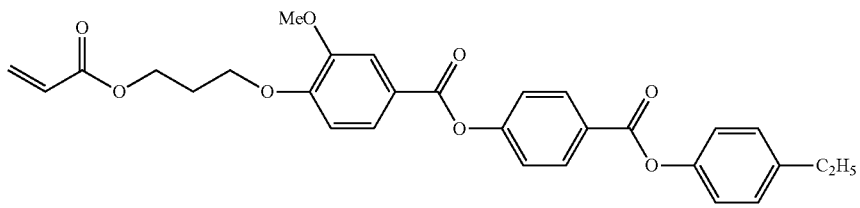
(I-124)
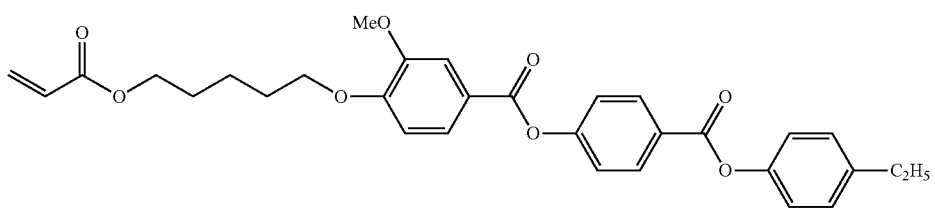
(I-125)
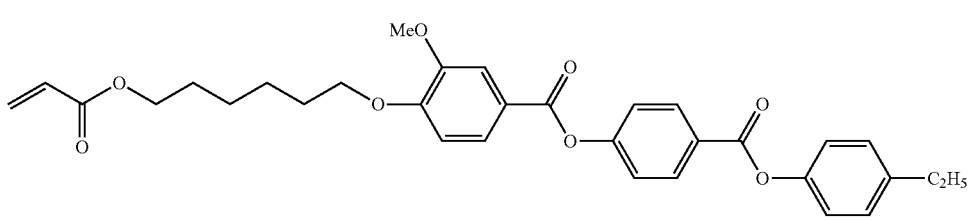
(I-126)
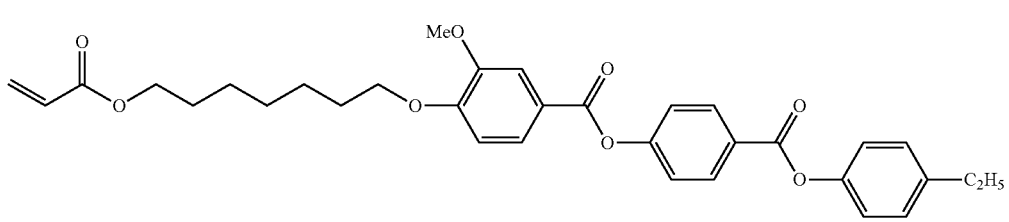
(I-127)
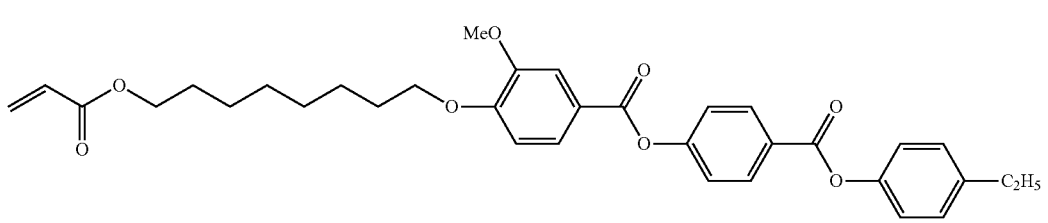
(I-128)
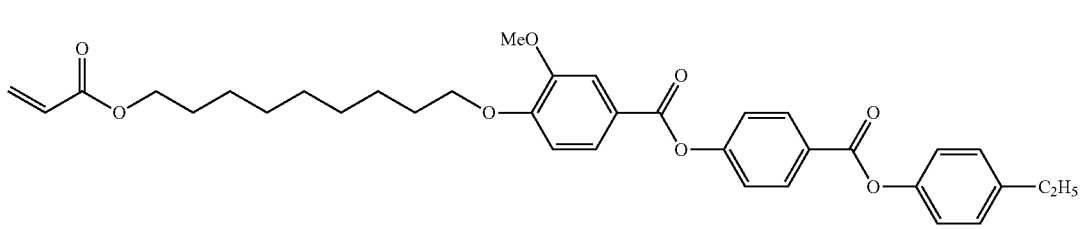
(I-129)
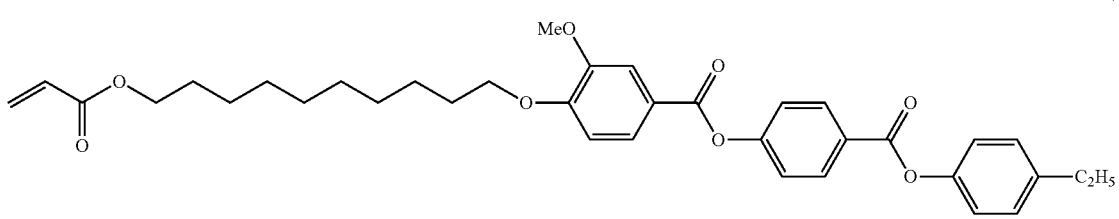
(I-130)

-continued
[Chem. 23]
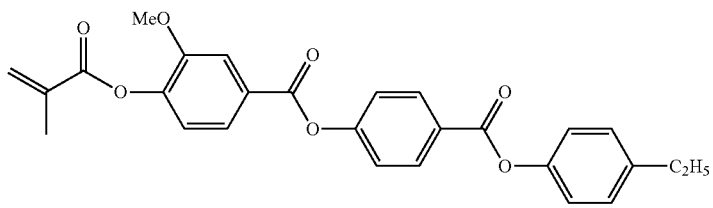
(I-131)
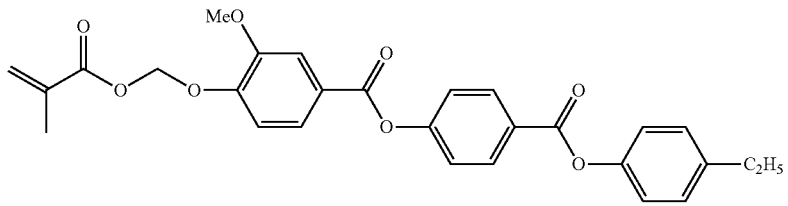
(I-132)
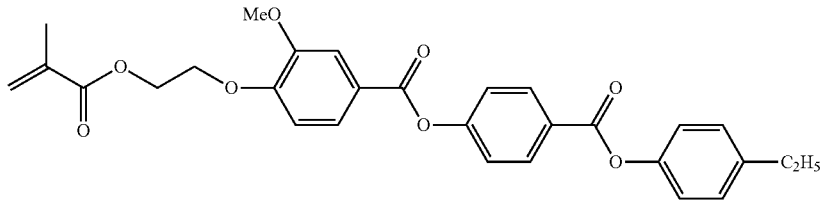
(I-133)
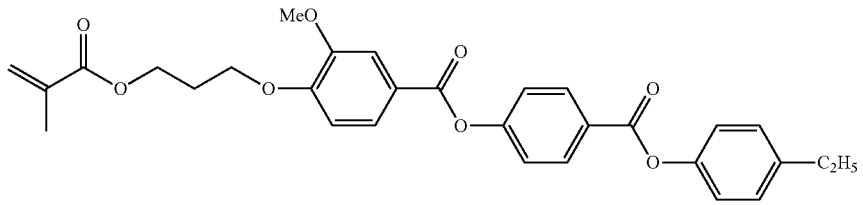
(I-134)
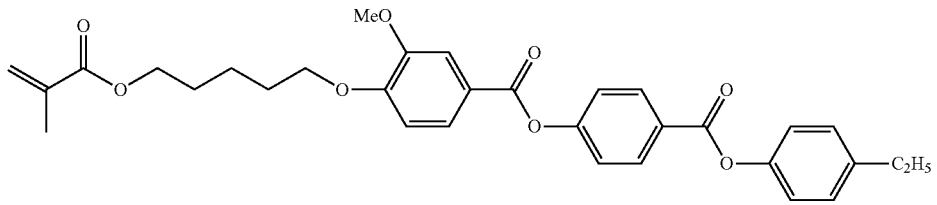
(I-135)
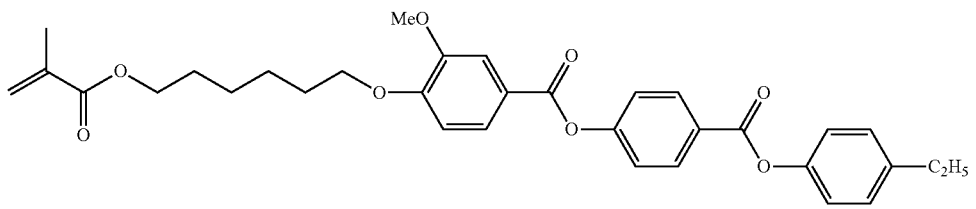
(I-136)
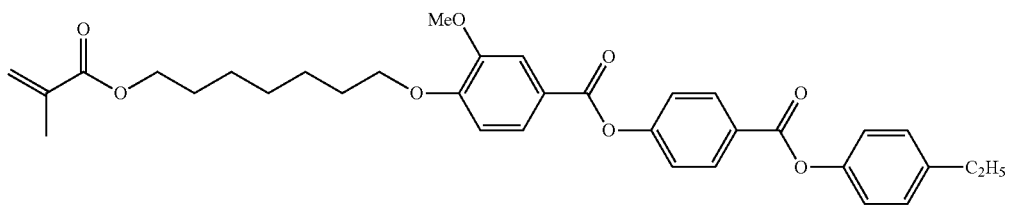
(I-137)

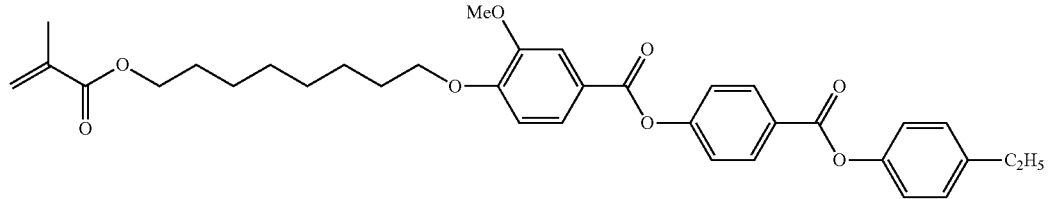
(I-138)
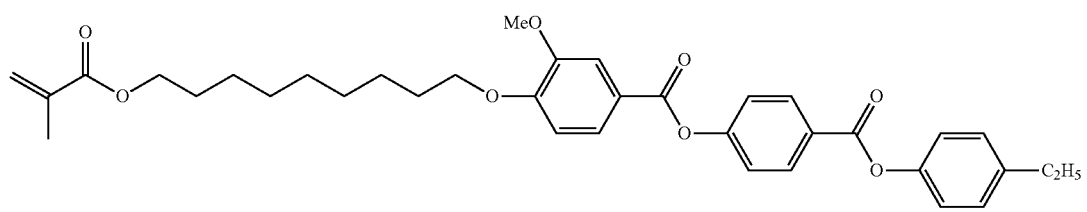
(I-139)
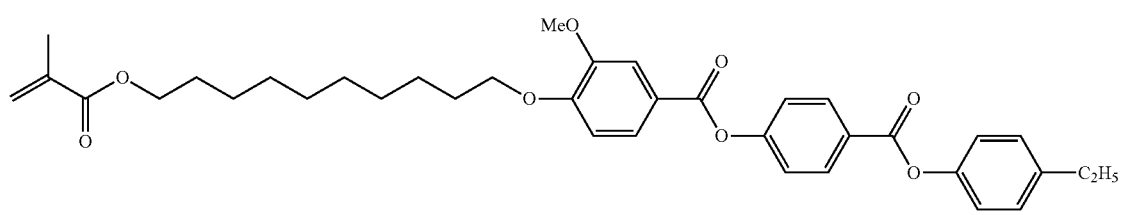
(I-140)
[Chem. 24]
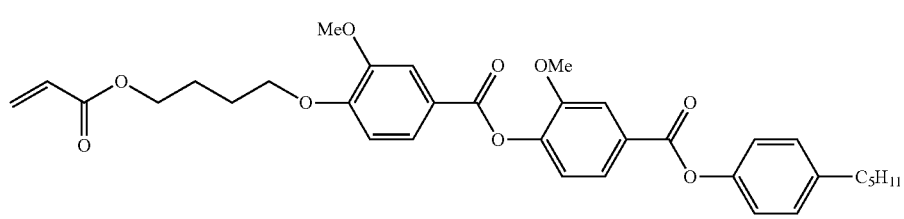
(I-141)
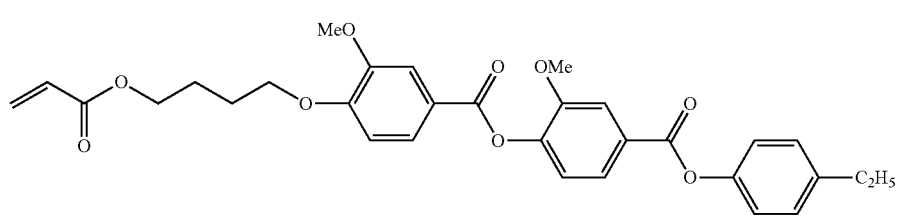
(I-142)
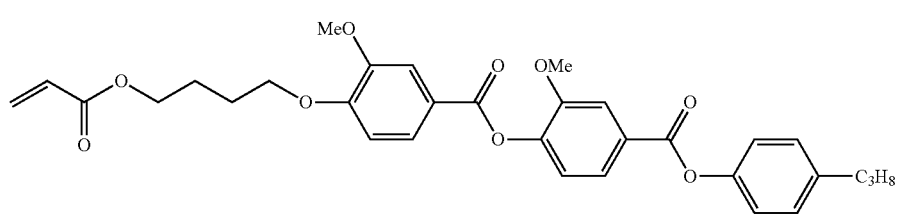
(I-143)
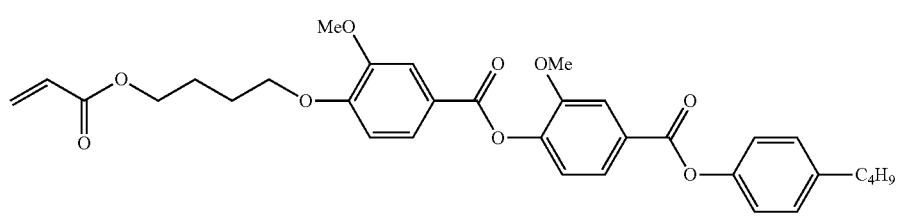
(I-145)

-continued
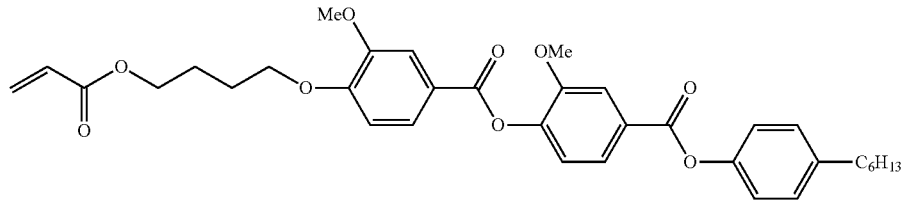
(I-146)
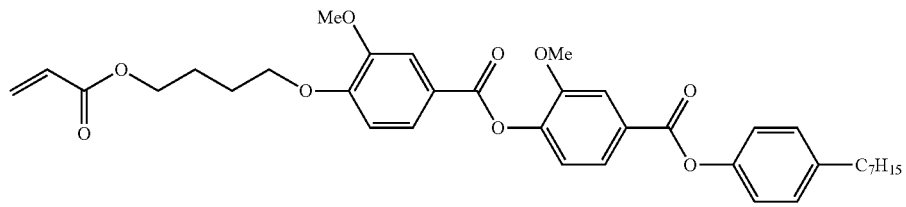
(I-147)
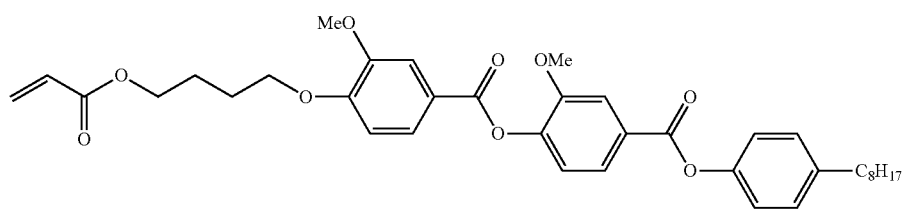
(I-148)
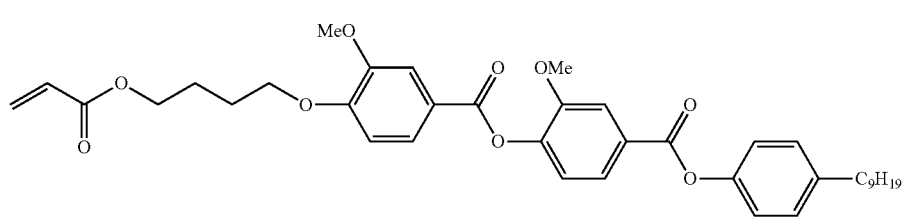
(I-149)
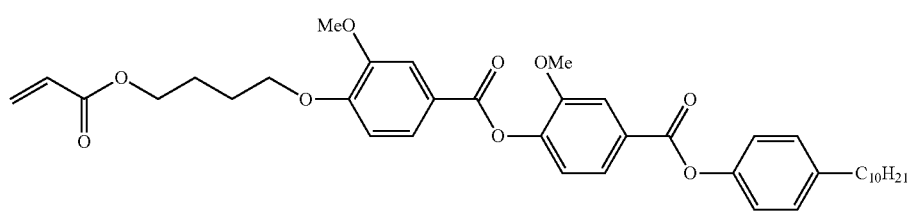
(I-150)
[Chem. 25]
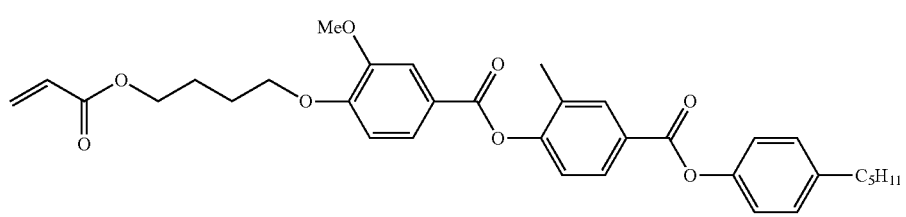
(I-151)
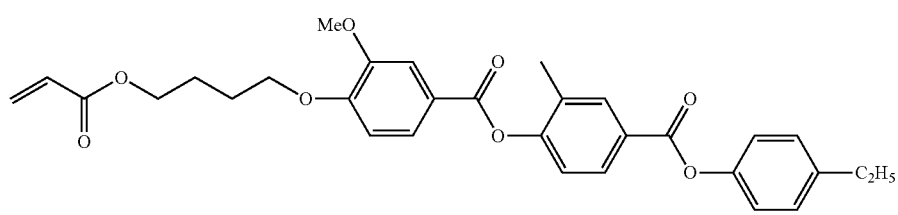
(I-152)

-continued
(I-153)
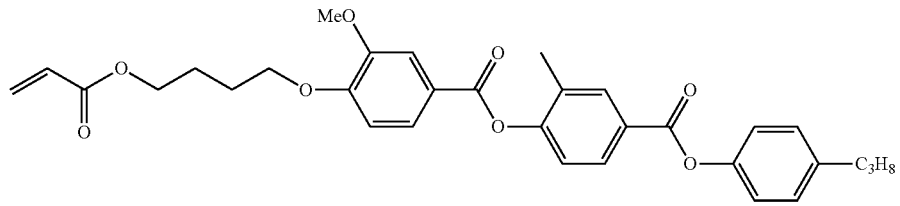
(I-155)
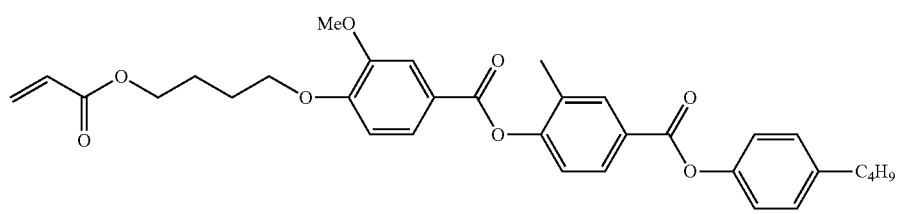
(I-156)
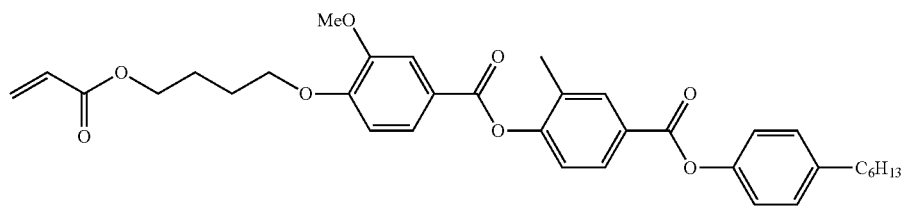
(I-157)
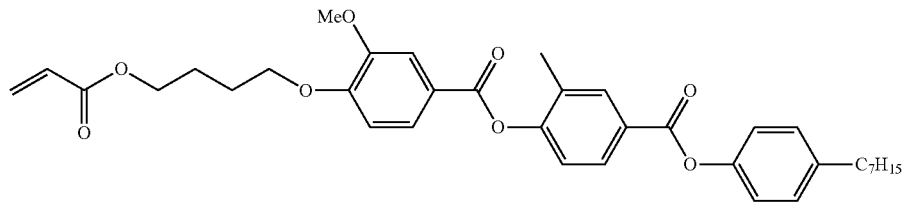
(I-158)
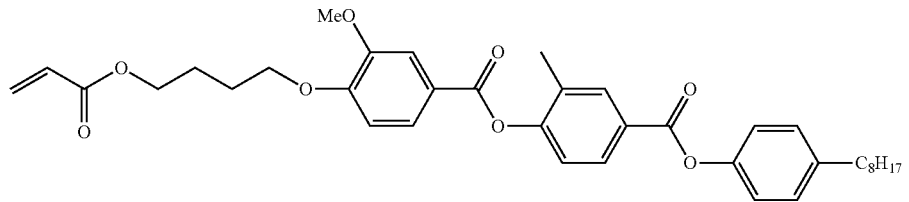
(I-159)
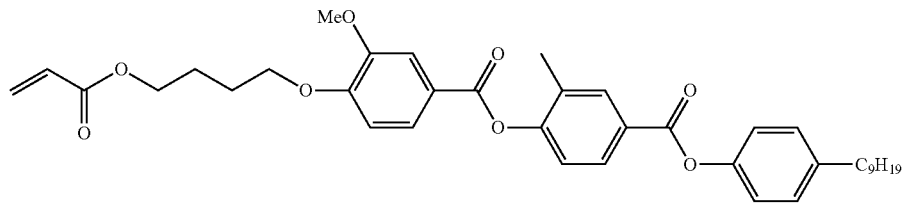
(I-160)
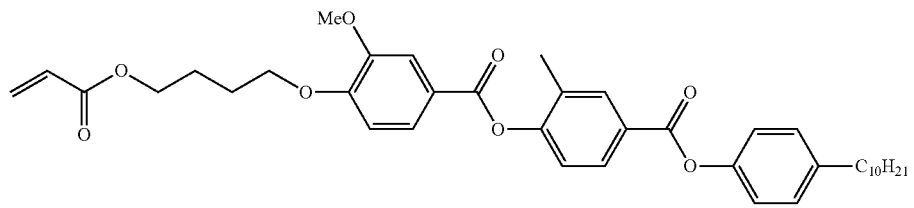

-continued
[Chem. 26]
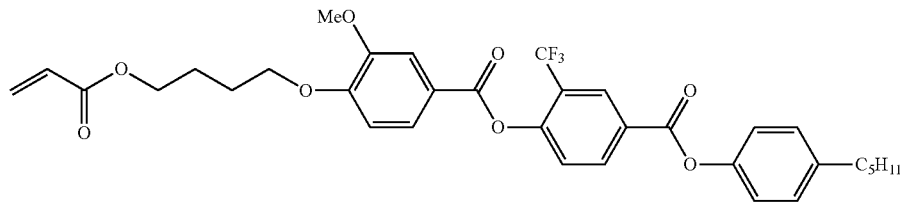
(I-161)
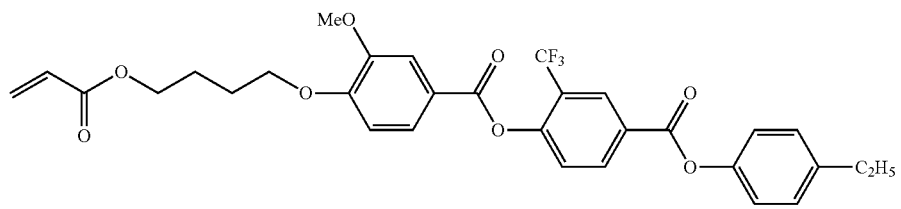
(I-162)
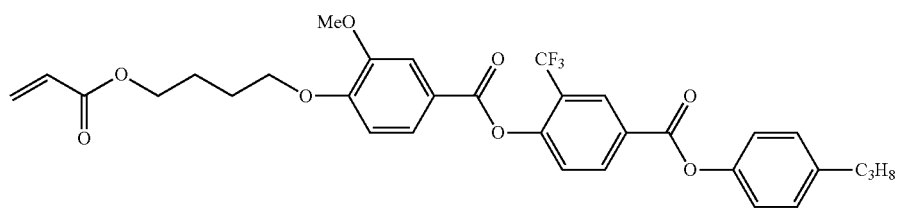
(I-163)
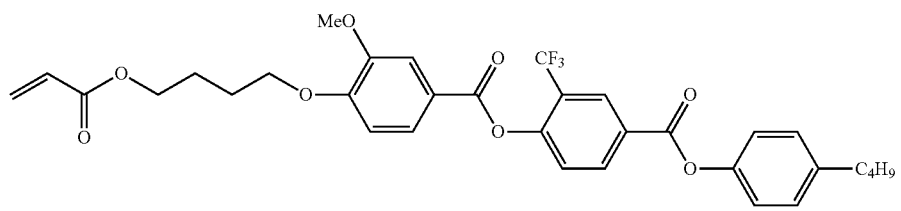
(I-165)
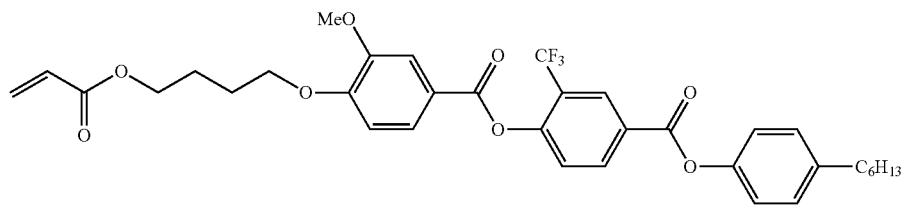
(I-166)
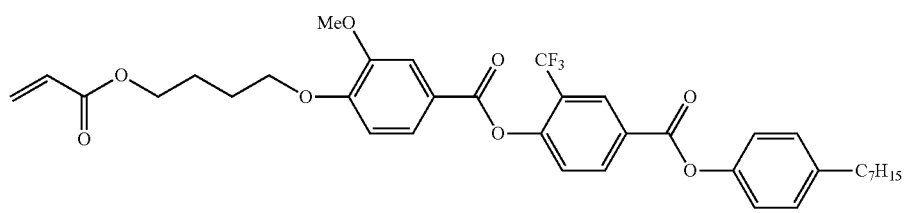
(I-167)
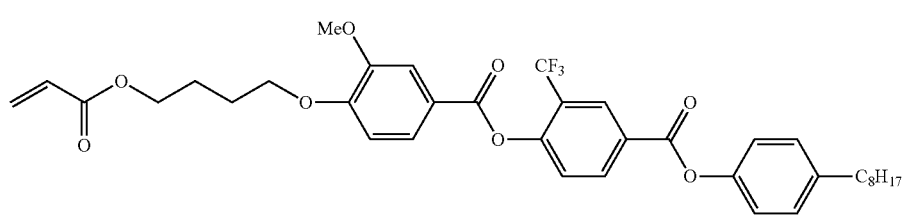
(I-168)

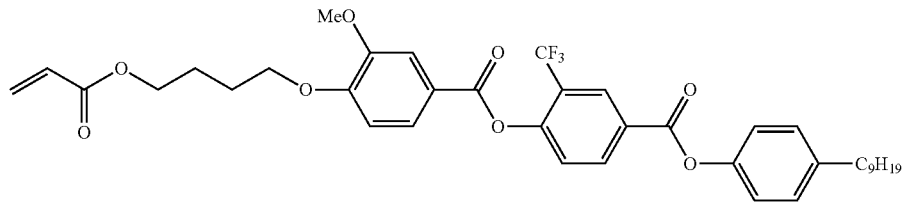
(I-169)
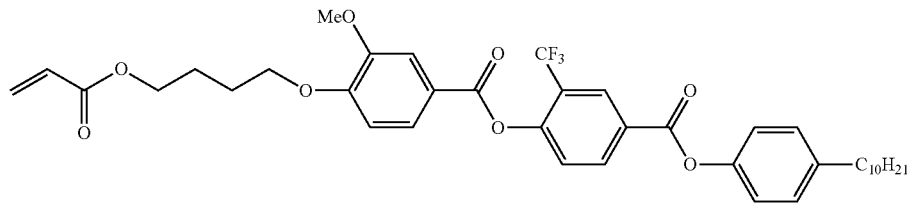
(I-170)
[Chem. 27]
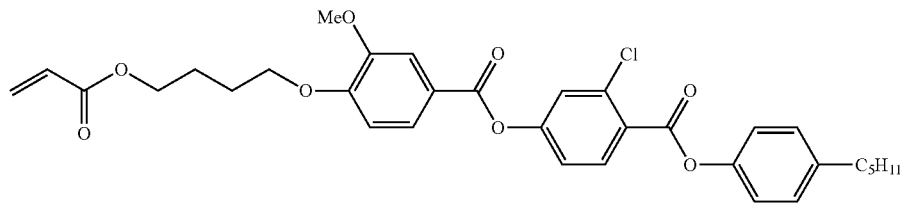
(I-171)
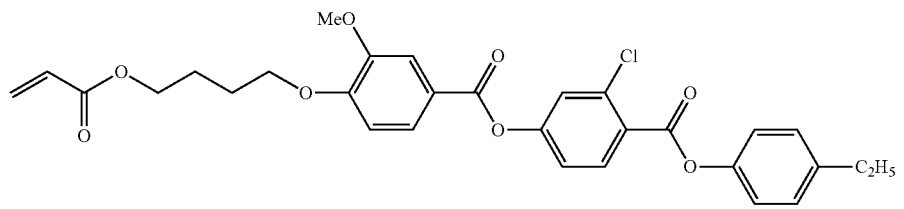
(I-172)
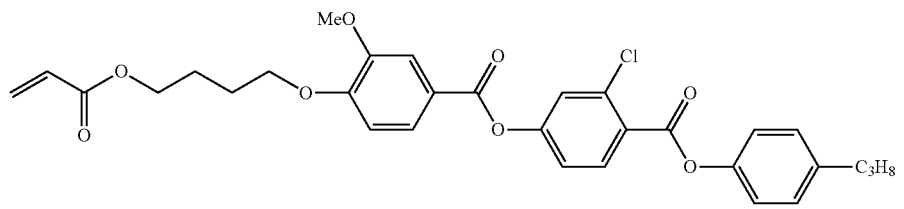
(I-173)
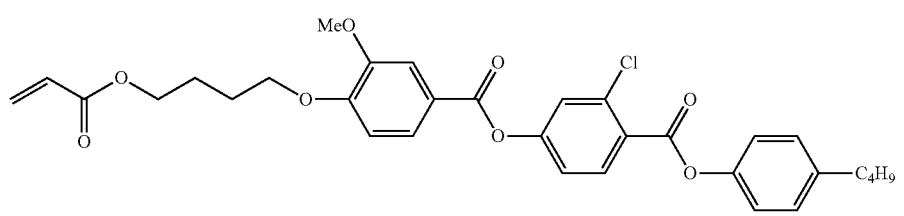
(I-175)
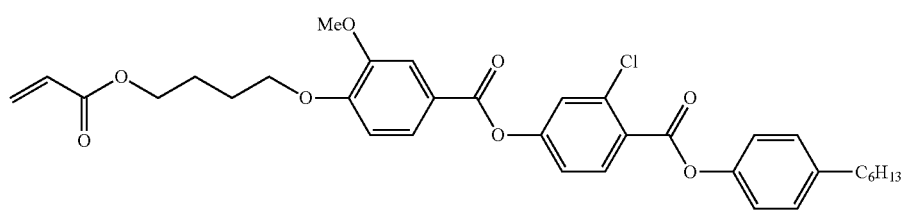
(I-176)

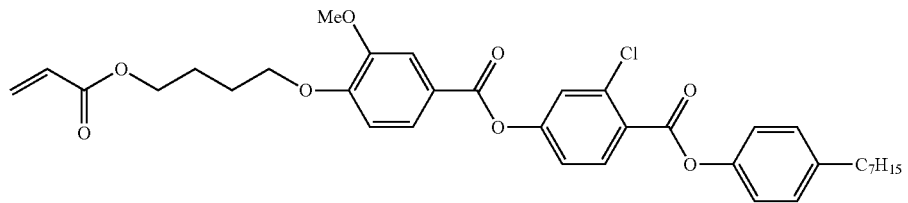
(I-177)
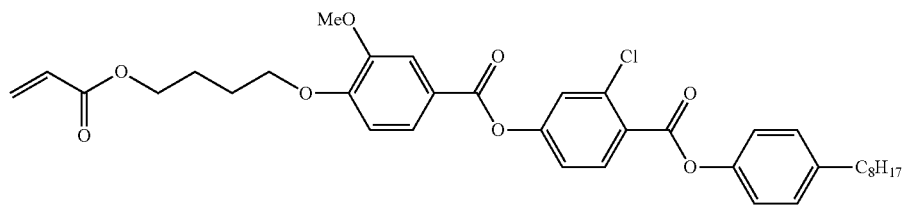
(I-178)
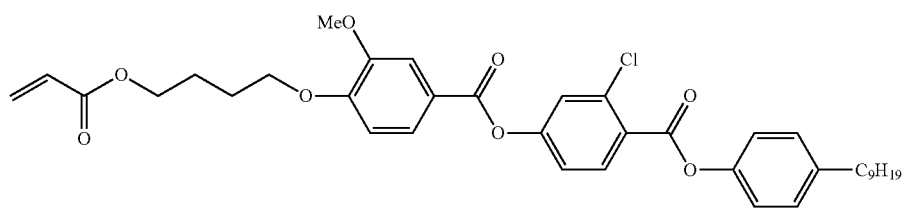
(I-179)
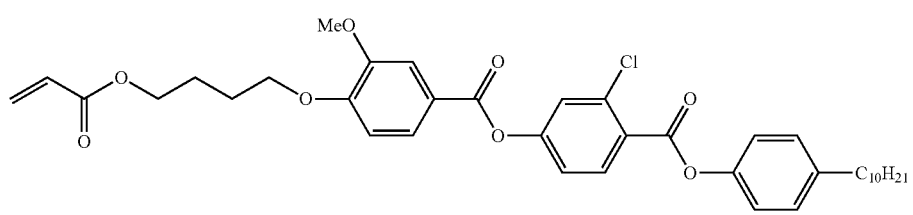
(I-180)
[Chem. 28]
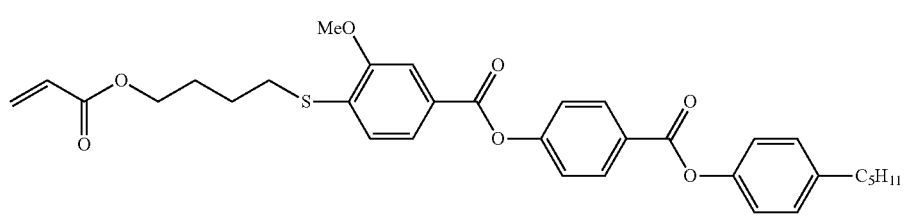
(I-181)
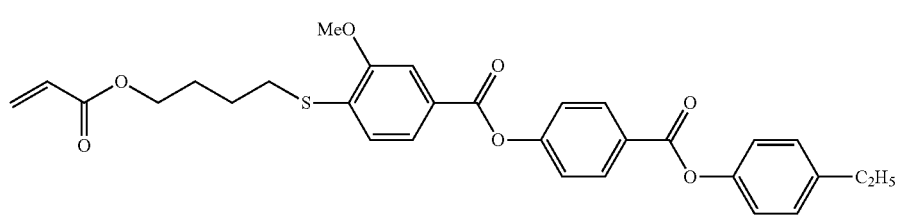
(I-182)
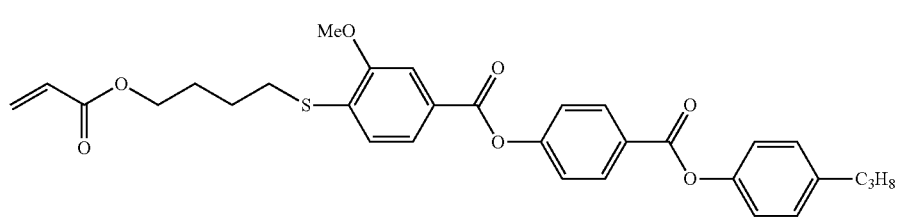
(I-183)

(I-184)
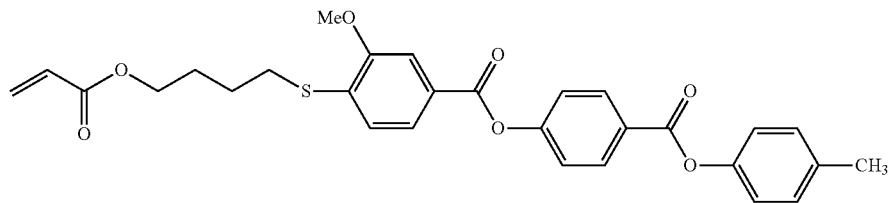
(I-185)
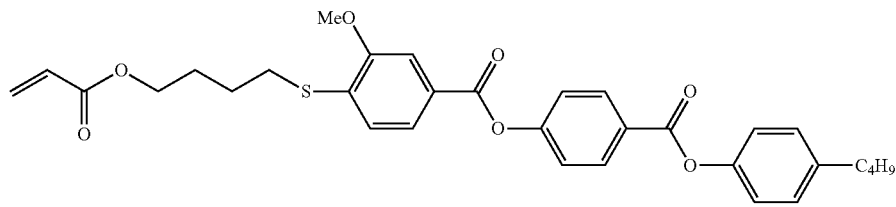
(I-186)
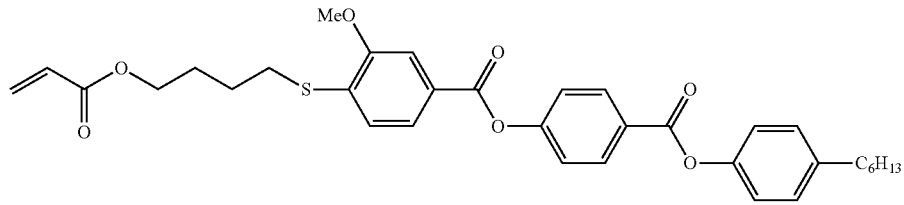
(I-187)
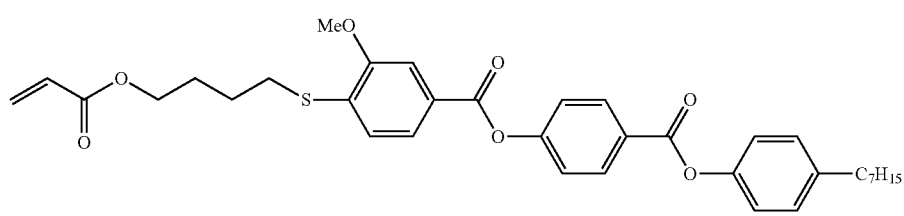
(I-188)
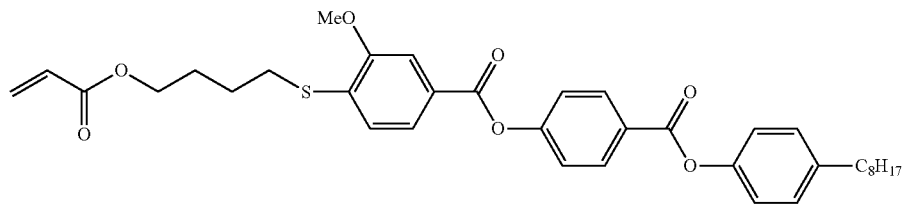
(I-189)
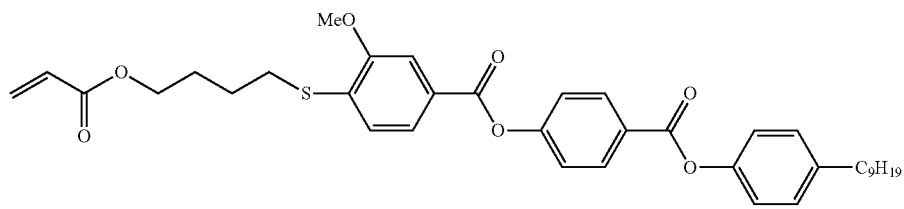
(I-190)
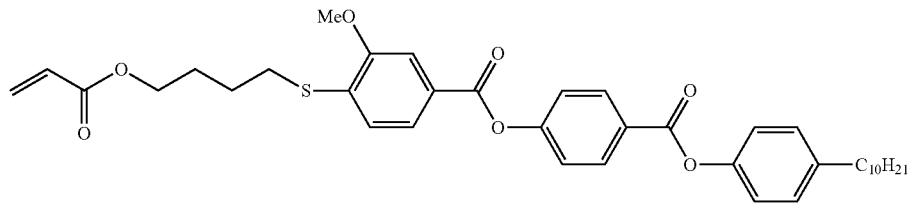

-continued
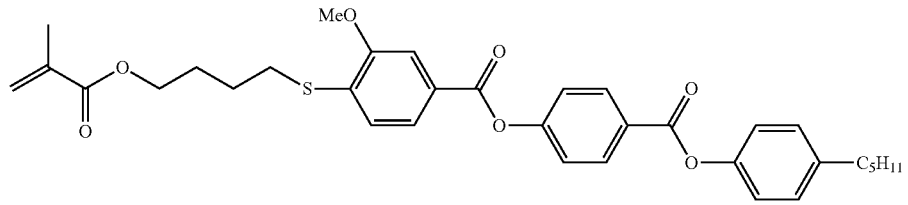 (I-191)
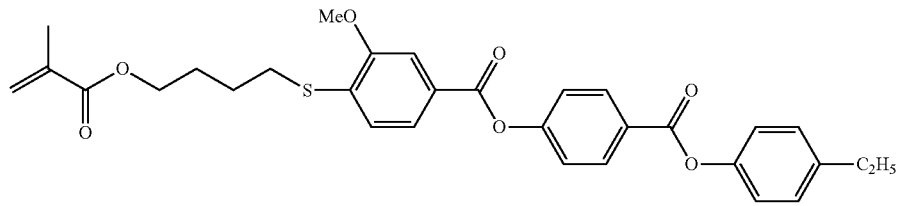 (I-192)
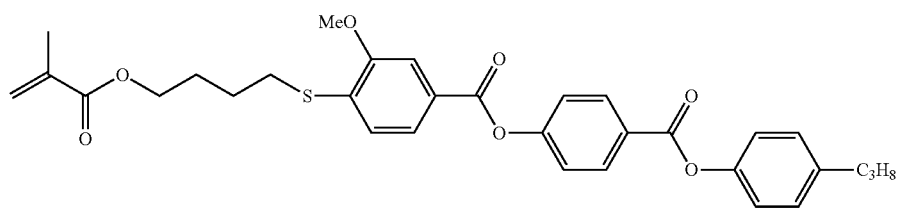 (I-193)
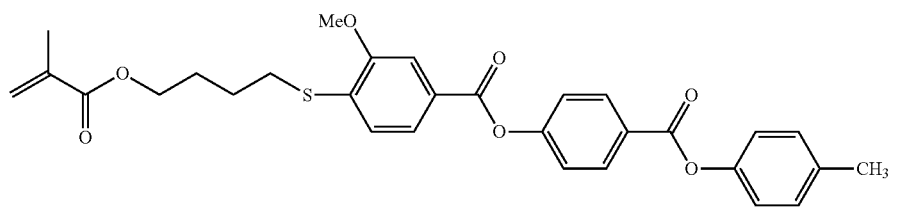 (I-194)
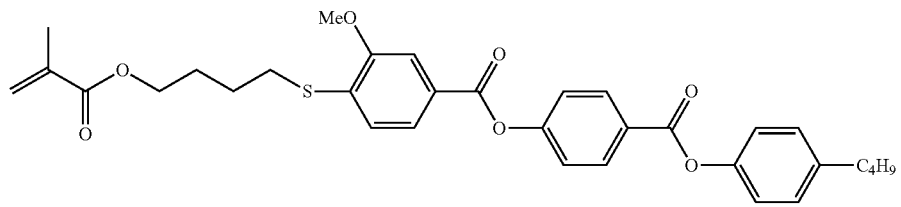 (I-195)
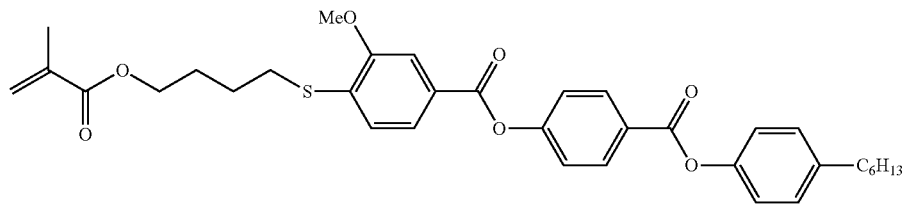 (I-196)
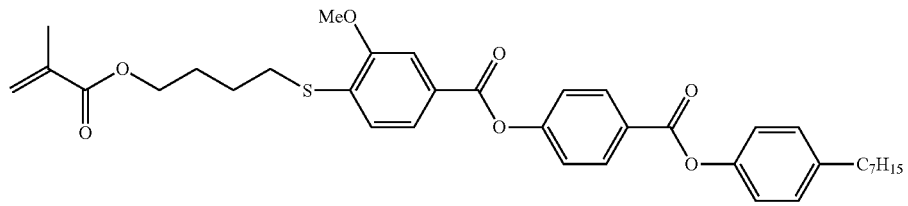 (I-197)

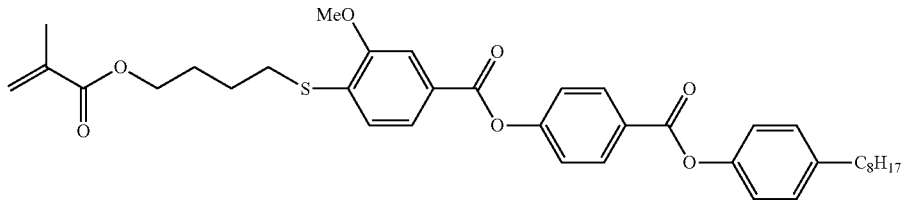

(I-198)

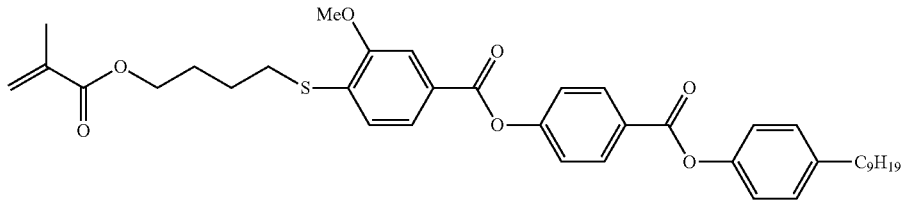

(I-199)

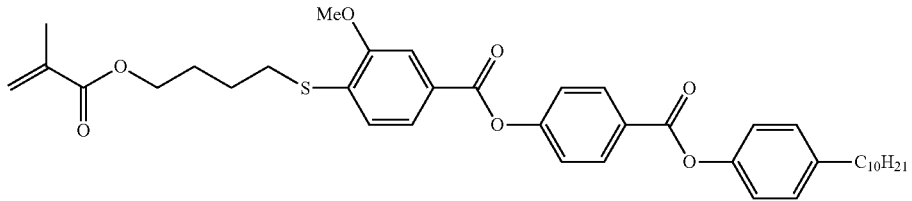

(I-200)

The polymerizable liquid-crystal compound of the invention can be synthesized by combining various synthesis methods.

For example, the polymerizable liquid-crystal compound represented by the general formula (I) may be synthesized in good yield according to the scheme 1 mentioned below.

Scheme 1

[Chem. 30]

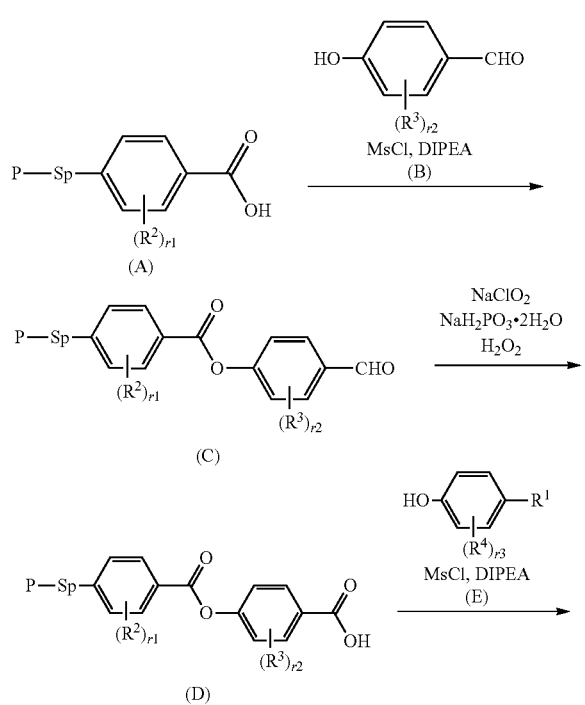

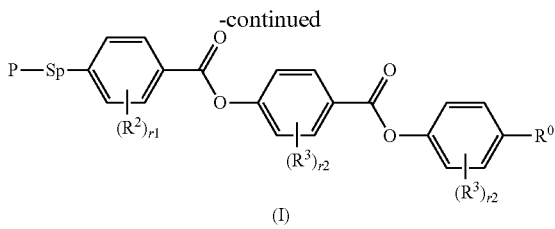

(I)

The definitions of P, Sp, $R^0$, $R^2$, $R^3$, $R^4$, $r_1$, $r_2$ and $r_3$ in the general formulae (A), (B), (C), (D) and (E) in the scheme 1 are the same as the definitions of P, Sp, $R^0$, $R^2$, $R^3$, $r_1$, $r_2$ and $r_3$ in the general formula (I).

In the scheme 1, first, a carboxylic acid represented by the general formula (A) and a phenol represented by the general formula (B) are used to give an aldehyde represented by the general formula (C). The reaction itself is a known reaction, for which any known condition may be suitably selected and employed. Next, the aldehyde represented by the general formula (C) is oxidized to give a carboxylic acid represented by the general formula (D). The reaction itself is a known reaction, for which any known condition may be suitably selected and employed. Finally, the carboxylic acid represented by the general formula (D) and a phenol represented by the general formula (E) are used to give a polymerizable liquid-crystal compound represented by the general formula (I). The reaction itself is a known reaction, for which any known condition may be suitably selected and employed. After the reaction, the system may be post-treated and purified in an ordinary manner to provide the polymerizable liquid-crystal compound represented by the general formula (I). The purification method includes, for example, recrystallization and column chromatography. The above-mentioned reaction conditions may be suitably modified and optimized.

The compounds for use in the scheme 1 may be commercially available ones, or may be synthesized by suitably selecting and employing known synthesis methods.

The polymerizable liquid-crystal compound of the invention is liquid-crystalline. In addition, the invention provides such a polymerizable liquid crystal that is effective as an additive for prevention of crystal deposition after coating with the general-purpose polymerizable liquid crystal (II), and therefore can further broaden the applications of the polymerizable liquid crystal (II).

In addition, the polymerizable liquid-crystal compound of the invention is chemically stable, readily soluble in solvent, readily polymerizable and colorless transparent, and therefore satisfies such multiple characteristics. A cured film to be produced by the use of the polymerizable liquid-crystal compound of the invention exhibits a sufficient hardness, is colorless and transparent and has good weather resistance and heat resistance, and therefore could satisfy such multiple characteristics. Consequently, the cured film formed by the use of the polymerizable liquid-crystal compound of the invention can be used in various applications of, for example, retardation plates, polarization elements, selective reflection films, color filters, antireflection films, viewing angle compensation films, holography, alignment films and others that are constituent elements of optical devices.

2. Polymerizable Composition

The invention also relates to a polymerizable composition containing at least one polymerizable liquid-crystal compound represented by the general formula (I).

One preferred embodiment of the polymerizable composition of the invention is a polymerizable composition containing at least one polymerizable liquid-crystal compound represented by the general formula (I) and at least one chiral compound. A more preferred embodiment of the polymerizable composition of the invention is a polymerizable composition containing at least one polymerizable liquid-crystal compound represented by the general formula (I), at least one chiral compound, and a polymerization initiator. The film produced by converting the polymerizable composition of this embodiment into a cholesteric liquid-crystal phase followed by fixing it exhibits a selective reflection characteristic relative to light having a predetermined wavelength in accordance with the helical pitch thereof, and is therefore useful as a reflection film (for example, IR reflection film).

In the polymerizable composition of the invention, the polymerizable liquid-crystal compound represented by the general formula (I) may be the main component or may be an additive. When the composition contains the polymerizable liquid-crystal compound represented by the general formula (I) in a ratio of at least 1% by mass relative to the total mass of the composition, then the composition can secure the effect of the compound of the general formula (I). Preferably, the content of the compound is from 2 to 85% by mass, more preferably from 3 to 75% by mass, even more preferably from 5 to 70% by mass. However, the range is not limitative.

The materials for use in the polymerizable composition of the invention, the method of using the polymerizable composition of the invention to provide a polymer material and a film, the materials for use in the method, and the applications of the produced film are described below.

(2-1) Chiral Compound

For preparing the polymerizable composition of the invention as a composition that exhibits a cholesteric liquid-crystal phase, it is desirable that a chiral compound is added thereto. The chiral compound may be liquid-crystalline or non-liquid-crystalline. The chiral compound may be selected from various types of known chiral agents (for example, described in Liquid-Crystal Device Handbook, Chap. 3, Sec. 4-3, TN, STN Chiral Agents, p. 199, edited by the Japan Society for the Promotion of Science, No. 142 Committee, 1989). A chiral compound generally contains an asymmetric carbon, but an axial asymmetric compound or a planar asymmetric compound may also be employable here. Examples of the axial asymmetric compound or the planar asymmetric compound include binaphthyl, helicene, paracyclophane and their derivatives. The chiral compound (chiral agent) may have a polymerizable functional group. In case where the chiral compound has a polymerizable functional group and where the rod-shaped liquid-crystal compound to be used here along with the chiral compound also has a polymerizable functional group, the polymerization reaction of the polymerizable chiral compound and the polymerizable rod-shaped compound gives a polymer having a recurring unit derived from the rod-shaped liquid-crystal compound and the recurring unit derived from the chiral compound. In this embodiment, it is desirable that the polymerizable functional group which the polymerizable chiral compound has is the same type of the polymerizable functional group which the polymerizable rod-shaped liquid-crystal compound has. Accordingly, it is desirable that the polymerizable functional group of the chiral compound is also an unsaturated polymerizable functional group, an epoxy group or an aziridinyl group, more preferably an unsaturated polymerizable functional group, even more preferably an ethylenic unsaturated polymerizable functional group.

Preferably, the amount of the chiral compound in the polymerizable composition of the invention is from 1 to 30 mol % relative to the polymerizable liquid-crystal compound represented by the general formula (I) to be in the composition. It is desirable that the amount of the chiral compound to be used is smaller as capable of reducing the influence of the compound on the liquid crystallinity. Consequently, the chiral compound is preferably one having a high torsion strength in order to attain the intended helical pitch torsion alignment even though its amount is small. As the chiral agent having such a high torsion strength, for example, there are mentioned the chiral agents described in JP-A 2003-287623, and these are favorably used in the invention.

(2-2) Other Liquid-Crystal Compounds

The polymerizable composition of the invention may contain any other one or more liquid-crystal compound along with the polymerizable liquid-crystal compound represented by the general formula (I) therein. The polymerizable liquid-crystal compound represented by the general formula (I) is highly miscible with any other liquid-crystal compound, and therefore, even though any other liquid-crystal compound is mixed in the composition, the composition is not opacified but can form a highly-transparent film. As capable of being combined with any other liquid-crystal compound, there can be provided various types of compositions usable in various applications. Examples of the other liquid-crystal compound for combination use here include rod-shaped nematic liquid-crystal compounds. Examples of the rod-shaped nematic liquid-crystal compound include azomethines, azoxy compounds, cyanobiphenyls, cyanophenyl esters, benzoate esters, phenyl cyclohexanecarboxylate esters, cyanophenylcyclohexanes, cyano-substituted phenylpyrimidines, alkoxy-substituted phenylpyrimidines, phenyldioxanes, tolanes and alkenylcyclohexylbenzonitriles. Not only low-molecular-weight liquid-crystal compounds but also high-molecular-weight liquid-crystal compound are usable here.

The other liquid-crystal compound usable in the invention may be polymerizable or non-polymerizable. Rod-shaped liquid-crystal compounds not having a polymerizable functional group are described in an abundance of literature (for example, Y. Goto, et. al., Mol. Cryst. Liq. Cryst. 1995, Vol. 260, pp. 23-28).

The polymerizable rod-shaped liquid-crystal compound may be obtained by introducing a polymerizable functional group into a rod-shaped liquid-crystal compound. Examples of the polymerizable functional group include an unsaturated polymerizable functional group, an epoxy group and an aziridinyl group, and preferred is an unsaturated polymerizable functional group, and more preferred is an ethylenic unsaturated polymerizable functional group. Such a polymerizable functional group may be introduced into the molecule of a rod-shaped liquid-crystal compound in various methods. The number of the polymerizable functional groups that the polymerizable rod-shaped liquid-crystal compound has is preferably from 1 to 6, more preferably from 1 to 3. Examples of the polymerizable rod-shaped liquid-crystal compound include the compounds described in Makromol. Chem., Vol. 190, p. 2255 (1989); Advanced Materials, Vol. 5, p. 107 (1993); U.S. Pat. Nos. 4,683,327, 5,622,648, 5,770,107; WO95/22586, WO95/24455, WO97/00600, WO98/23580, WO98/52905; JP-A 1-272551, 6-16616, 7-110469, 11-80081, 2001-328973, etc. Two or more different types of polymerizable rod-shaped liquid-crystal compounds may be used here as combined. When two or more different types of polymerizable rod-shaped liquid-crystal compounds may be used here as combined, then the alignment temperature of the compound may be lowered.

Above all, it is desirable that the polymerizable composition of the invention contains a polymerizable liquid-crystal compound represented by the following general formula (II):

[Chem. 31]

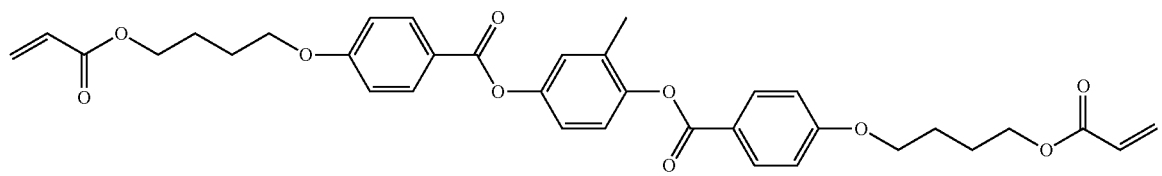

(II)

The amount of the other liquid-crystal compound to be added is not specifically defined. The content ratio of the polymerizable liquid-crystal compound represented by the general formula (I) may be high, or the content layer of the other liquid-crystal compound may be high, or the two may be the same; and the content ratio of the compound may be suitably controlled within a preferred range.

Preferably, the polymerizable composition of the invention contains the polymerizable liquid-crystal compound represented by the general formula (I) in a ratio of from 1/99 to 60/40 relative to the polymerizable liquid-crystal compound represented by the general formula (II), more preferably in a ratio of from 3/97 to 50/50, even preferably from 5/95 to 40/60 (all by mass).

(2-3) Polymerization Initiator

Preferably, the polymerizable composition of the invention contains a polymerization initiator. For example, in an embodiment of promoting the curing reaction through irradiation with UV rays to give a cured film, the polymerization initiator to be used is preferably a photopolymerization initiator capable of initiating polymerization through irradiation with UV rays. Examples of the photopolymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, 2,951,758), combination of triarylimidazole dimer and p-aminophenylketone (described in U.S. Pat. No. 3,549,367), acridine and phenazine compounds (described in JP-A 60-105667, U.S. Pat. No. 4,239,850), oxadiazole compounds (described in U.S. Pat. No. 4,212,970).

The amount of the photopolymerization initiator to be used is preferably from 0.1 to 20% by mass of the composition (in case where the composition is a coating liquid, the solid content thereof), more preferably from 1 to 8% by mass.

(2-4) Alignment Control Agent

An alignment control agent that contributes toward stable and rapid formation of a liquid-crystal phase (for example, cholesteric liquid-crystal phase) may be added to the polymerizable composition of the invention. Examples of the alignment control agent include fluoro(meth)acrylate polymers and compounds represented by the following general formulae (X1) to (X3). Two or more selected from these may be used here. These compounds may reduce the tilt angle of the molecules of a liquid-crystal compound or may align the molecules thereof substantially horizontally, in the air interface of the layer. In this description, "horizontal alignment" means that the major axis of the liquid-crystal molecule is parallel to the film surface, but does not require that the two are strictly parallel to each other. In this description, the alignment means that the tilt angle of the molecule to the horizontal plane is less than 20 degrees. In case where a liquid-crystal compound is horizontally aligned near the air interface, alignment defect would hardly occur and therefore the transparency in the visible light region could be high. On the other hand, when the molecules of a liquid-crystal compound are aligned at a large tilt angle, for example, in a cholesteric liquid-crystal phase, then the helical axis thereof may deviate from the normal line of the film plane and, as a result, the reflectance may lower and there may be formed finger print patterns to thereby unfavorably cause haze increase and diffraction.

Examples of the fluoro(meth)acrylate polymer usable as the above-mentioned alignment control agent are described in JP-A 2007-272185, [0018] to [0043], etc.

The following general formulae (X1) to (X3) usable as the alignment control agent are described in order.

[Chem. 32]

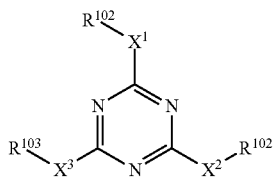

General Formula (X1)

In the formula, $R^{101}$, $R^{102}$ and $R^{103}$ each independently represent a hydrogen atom or a substituent; $X^1$, $X^2$ and $X^3$ each represent a single bond or a divalent linking group. The substituent represented by $R^{101}$ to $R^{103}$ is preferably a substituted or unsubstituted alkyl group (above all, more preferred is an unsubstituted alkyl group or a fluorine-substituted alkyl group), an aryl group (above all, more preferred is a fluorine-substituted alkyl group-having aryl group), a substituted or unsubstituted amino group, an alkoxy group, an alkylthio group or a halogen atom. The divalent linking group represented by $X^1$, $X^2$ and $X^3$ is preferably a divalent linking group selected from an alkylene group, an alkenylene group, a divalent aromatic group, a divalent hetero ring residue, —CO—, —NRa— (Ra represents an alkyl group having from 1 to 5 carbon atoms, or a hydrogen atom), —O—, —S—, —SO—, —SO$_2$— and their combinations. The divalent linking group is more preferably a divalent linking group selected from an alkylene group, a phenylene group, —CO—, —NRa—, —O—, —S— and —SO$_2$—, or a divalent linking group comprising a combination of two or more selected from those groups. Preferably, the carbon number of the alkylene group is from 1 to 12. Preferably, the carbon number of the alkenylene group is from 2 to 12. Preferably, the carbon number of the divalent aromatic group is from 6 to 10.

[Chem. 33]

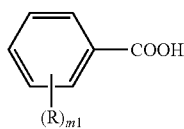

General Formula (X2)

In the formula, R represents a substituent, and m1 indicates an integer of from 0 to 5. When m1 is an integer of 2 or more, multiple R's may be the same or different. Preferred substituents for R are the same as those mentioned hereinabove as the substituents represented by $R^{101}$, $R^{102}$ and $R^{103}$. m1 is preferably an integer of from 1 to 3, more preferably 2 or 3.

[Chem. 34]

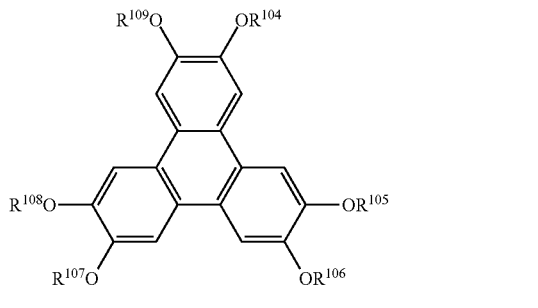

General Formula (X3)

In the formula, $R^{104}$, $R^{105}$, $R^{106}$, $R^{107}$, $R^{108}$ and $R^{109}$ each independently represent a hydrogen atom or a substituent. The substituent represented by $R^{104}$, $R^{105}$, $R^{106}$, $R^{107}$, $R^{108}$ and $R^{109}$ is preferably the same as that mentioned hereinabove as the preferred substituents represented by $R^{101}$, $R^{102}$ and $R^{103}$ in the general formula (X1).

Examples of the compounds represented by the above formulae (X1) to (X3) usable as the alignment control agent in the invention include the compounds described in JP-A 2005-99248.

In the invention, one alone or two or more of the compounds represented by the above general formulae (X1) to (X3) may be used as the alignment control agent.

The amount of the compound represented by the general formulae (X1) to (X3) in the polymerizable composition of the invention is preferably from 0.01 to 10% by mass of the mass of the compound of the above general formula (I) therein, more preferably from 0.01 to 5% by mass, even more preferably from 0.02 to 1% by mass.

(2-5) Other Additives

The polymerizable composition of the invention may contain one or more other additives, such as antioxidant, UV absorbent, sensitizer, stabilizer, plasticizer, chain transfer agent, polymerization inhibitor, defoaming agent, leveling agent, thickener, flame retardant, surface-active substance, dispersant, colorant such as dye, pigment, etc.

3. Polymer Material and Film (3-1) Polymer Material and Film

The invention also relates to a polymer material and a film produced by the use of the polymerizable liquid-crystal compound of the invention or the polymerizable composition of the invention. The polymer material is produced by polymerizing the polymerizable composition of the invention, and may be liquid-crystalline or non-liquid-crystalline. The film to be produced by the use of the polymerizable composition of the invention is preferably liquid-crystalline; and the liquid-crystal film is useful as various optical films such as retardation film, reflection film, etc. The polymerizable composition of the invention is useful as a material for various optical films such as retardation film, reflection film, etc.

(3-2) Method for Producing Polymer Material and Film Using Polymerizable Composition.

The method for producing the polymer material of the invention comprises a step of polymerizing the polymerizable liquid-crystal compound of the invention or the polymerizable composition of the invention. In the method for producing the polymer material of the invention, preferably, the polymerization is attained through irradiation with UV rays.

One example of the production method for the polymer material and the production method for the film of the invention includes at least the following:

(i) applying the polymerizable composition of the invention onto the surface of a substrate or the like and converting it into a liquid-crystal phase (cholesteric liquid-crystal phase, etc.);

(ii) promoting the curing reaction of the polymerizable composition to thereby fix the liquid-crystal phase to form a cured film.

The steps (i) and (ii) may be repeated multiple times to produce a laminate film of a plurality of those cured films.

In the above step (i), first, the polymerizable composition of the invention is applied onto the surface of a substrate or onto the surface of an alignment film formed on a substrate. The composition is preferably prepared as a coating liquid by dissolving and/or dispersing the materials in a solvent. The solvent to be used in preparing the coating liquid is preferably an organic solvent. The organic solvent includes amides (e.g., N,N-dimethylformamide); sulfoxides (e.g., dimethylsulfoxide); heterocyclic compounds (e.g., pyridine); hydrocarbons (e.g., benzene, hexane); alkyl halides (e.g., chloroform, dichloromethane); esters (e.g., methyl acetate, butyl acetate); ketones (e.g., acetone, methyl ethyl ketone); ethers (e.g., tetrahydrofuran, 1,2-dimethoxyethane); 1,4-butanediol diacetate, etc. Of those, especially preferred are alkyl halides and ketones. Two or more such organic solvents may be used here as combined.

Coating with the coating liquid may be attained in various methods such as a wire bar coating method, an extrusion coating method, a direct gravure coating method, a reverse gravure coating method, a die coating method, etc. Also employable here is an inkjet apparatus where the composition is jetted out through the nozzle to form a coating film.

Next, the composition applied to the surface to be a coating film is processed to be a liquid-crystal phase such as a cholesteric liquid-crystal phase, etc. In the embodiment where the composition is prepared as a coating liquid that contains a solvent, the coating film is dried and the solvent is removed, whereby the composition may be converted into a state of a liquid-crystal phase. For making the composition at a transition temperature at which the composition is converted into a liquid-crystal phase, the coating film may be optionally heated. For example, once the coating film is heated up to a temperature of the isotropic phase thereof, and then it is cooled down to a liquid-crystal phase transition temperature, whereby the composition could be stably converted into a state of liquid-crystal phase. The liquid-crystal phase transition temperature of the composition is preferably within a range of from 10 to 250° C. from the viewpoint of the production aptitude, more preferably from 10 to 150° C. When the temperature is lower than 10° C., then the production process would require a cooling step for lowering the coating film to a temperature range in which the film could exhibit a liquid-crystal phase. On the other hand, when the temperature is higher than 200° C., the process would require a high temperature in order that the coating film could be in an isotropic liquid state at a further higher temperature than the temperature range in which the film could be once a liquid-crystal phase, and such is unfavorable from the viewpoint of heat energy wasting, substrate deformation, degradation, etc.

Next, in the step (ii), the coating film that has become a state of a liquid-crystal phase is cured. The curing may be attained according to any polymerization process of a radical polymerization method, an anionic polymerization method, a cationic polymerization method, a coordination polymerization method or the like. In accordance with the compound of the general formula (I), a suitable polymerization method may be selected. The polymerization gives a polymer that has a unit derived from the compound of the general formula (I) of the invention, in the constituent unit thereof.

In one example, the curing reaction is promoted through irradiation with UV rays. For irradiation with UV rays, usable is a light source of a UV lamp, etc. In this step, the irradiation with UV rays promotes the curing reaction of the composition to fix the formed cholesteric liquid-crystal phase, thereby forming a cured film.

The energy dose in irradiation with UV rays is not specifically defined. In general, preferred is a dose of from 100 mJ/cm$^2$ to 800 mJ/cm$^2$. The time for which the coating film is irradiated with UV rays is not also specifically defined. The time may be determined from the viewpoint of both the sufficient strength of the cured film and the productivity thereof.

The polymerizable liquid-crystal compound represented by the general formula (I) of the invention is hardly degraded by UV rays, and therefore can maintain excellent liquid crystallinity and durability even after irradiation with UV rays.

For accelerating the curing reaction, the UV irradiation may be carried out under heat. Preferably, the temperature in irradiation with UV rays is kept in a range of a liquid-crystal phase temperature so as not to disturb the liquid-crystal phase of the film. The oxygen concentration in the atmosphere participates in the degree of polymerization, and therefore, in case where the reaction could not secure the desired degree of polymerization in air and where the film strength is therefore insufficient, it is desirable that the oxygen concentration in the atmosphere is reduced according to a nitrogen-purging method or the like.

In the above step, the liquid-crystal phase is fixed to give a cured film. Here, regarding the "fixed" state of the liquid-crystal phase, a condition where the alignment of the compound that exhibits the liquid-crystal phase is maintained as such is a most typical and preferred embodiment. However, not limited thereto but concretely, the fixed state means that the layer has no more fluidity in a temperature range of generally from 0° C. to 50° C., but from −30° C. to 70° C. in a more severe condition, and can continue to stably keep the fixed alignment state thereof without providing any change in the alignment state by any external field or external force. In the invention, the alignment state of the liquid-crystal phase is fixed by the curing reaction that is promoted through irradiation with UV rays.

In the invention, it is enough that the optical properties of the liquid-crystal phase are maintained in the layer, and finally the composition in the cured film would not need to exhibit any more the liquid crystallinity. For example, the composition is polymerized to have an increased molecular weight through the curing reaction to thereby have no more liquid crystallinity.

The thickness of the cured film is not specifically defined. The preferred film thickness will be determined depending on the use of the film and on the desired optical characteristics thereof. In general, the thickness is preferably from 0.05 to 50 μm, more preferably from 1 to 35 μm.

(3-3) Substrate

The film of the invention may have a substrate. The substrate is not specifically defined in point of the material and the optical characteristics thereof so far as it is self-supporting and can support the cured film. The substrate may be selected from glass plates, quartz plates, polymer films, etc. Depending on the intended use thereof, the substrate may be required to have high transparency against UV rays. As a polymer film having a high visible-light transmittance, there are mentioned polymer films for various types of optical films that are used as members of display devices such as liquid-crystal display devices, etc. The substrate includes, for example, polyester films of polyethylene terephthalate (PET), polybutylene terephthalate, polyethylene naphthalate (PEN), etc.; polycarbonate (PC) films, polymethylmethacrylate films; polyolefin films of polyethylene, polypropylene, etc.; polyimide films, triacetyl cellulose (TAC) films, etc. Preferred are polyethylene terephthalate and triacetyl cellulose.

(3-4) Alignment Layer

The film of the invention may have an alignment layer between the substrate and the cured film. The alignment layer has a function of more accurately defining the alignment direction of the liquid-crystal compound in the film. The alignment film may be provided according to a means of rubbing treatment of an organic compound (preferably, polymer), oblique vapor deposition of an inorganic compound, formation of a layer having microgrooves, etc. Further, there is known an alignment layer capable of being given an alignment function through impartation thereto of an electric field or impartation thereto of a magnetic field or through photoirradiation. Preferably, the alignment layer is formed by rubbing the surface of a polymer film.

As the material for the alignment layer, preferred is a polymer of an organic compound. Favorably used as the layer is a polymer that is crosslinkable by itself, or a polymer that may be crosslinked by a crosslinking agent. Naturally, usable here is a polymer having both the functions. Examples of the polymer include polymer compounds such as polymethyl methacrylate, acrylic acid/methacrylic acid copolymer, styrene/maleinimide copolymer, polyvinyl alcohol and modified polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene, polycarbonate and the like, and other compounds such as silane coupling agents, etc. Preferred examples of the polymer are water-soluble polymers such as poly(N-methylolacrylamide), carboxymethyl cellulose, gelatin, polyvinyl alcohol and modified polyvinyl alcohol, etc. More preferred are gelatin, polyvinyl alcohol and modified polyvinyl alcohol; and even more preferred are polyvinyl alcohol and modified polyvinyl alcohol.

(3-5) Use of Film of Invention

One embodiment of the film of the invention is a film of the polymerizable composition of the invention, which exhibits optical anisotropy and in which the alignment (for example, horizontal alignment, vertical alignment, hybrid alignment or the like) of the liquid-crystal phase is fixed. The film is used as an optical compensation film or the like in liquid-crystal display devices, etc.

One embodiment of the film of the invention is a film in which the cholesteric liquid-crystal phase of the polymerizable composition of the invention is fixed, and which exhibits a selective reflection characteristic to light in a predetermined wavelength range. Preferably, the film of the invention exhibits a selective reflection characteristic in an IR wavelength range. The film that exhibits a selective reflection characteristic in an IR wavelength range (wavelength 800 to 1300 nm) can be stuck to windowpanes of buildings or vehicles or can be incorporated in laminated glass, and can be therefore utilized as heat-shielding members.

The film of the invention can also be utilized in various applications of polarization elements, selective reflection films, color filters, antireflection films, viewing angle compensation films, holography, alignment films and others that are constituent elements of optical devices.

EXAMPLES

The characteristics of the invention are described more concretely with reference to Examples and Comparative Examples given hereunder. In the following Examples, the material used, its amount and ratio, the details of the treatment and the treatment process may be suitably modified or changed not overstepping the scope of the invention. Accordingly, the invention should not be limitatively interpreted by the Examples mentioned below.

Synthesis of Polymerizable Liquid-Crystal Compound of Invention

Example 1

The compound (I-1) was synthesized according to the following scheme:

[Chem. 35]

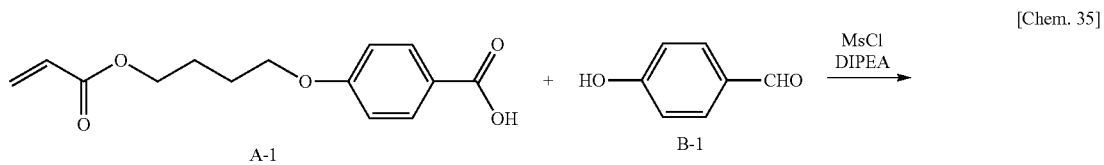

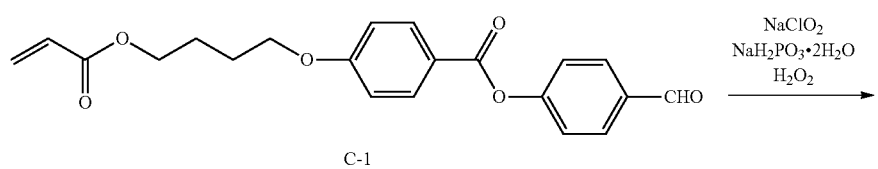

-continued

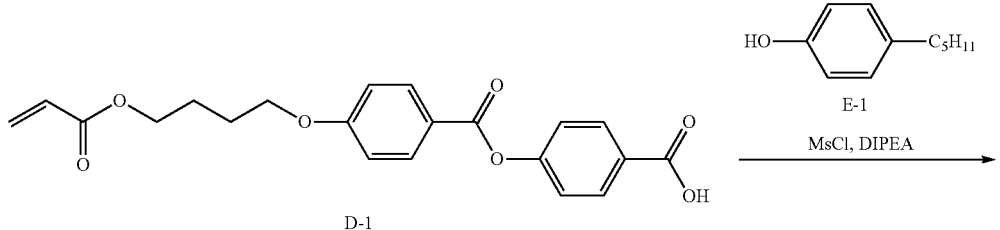

D-1

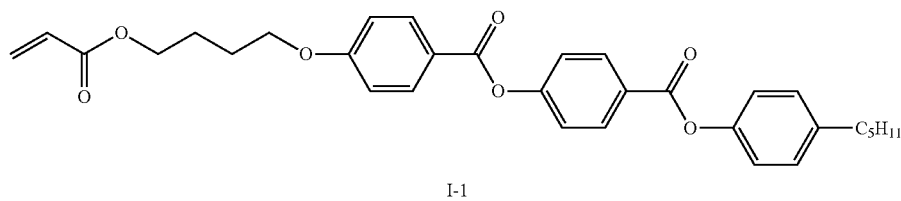

I-1

Hydroquinone monomethyl ether (37 mg) was added to a THF solution (17 mL) of methanesulfonyl chloride (33.0 mmol, 2.6 mL), and cooled to have an inner temperature of −5° C. A THF solution (16 mL) of A-1 (31.5 mmol, 8.33 g) and diisopropylethylamine (33.0 mmol, 5.75 mL) was dropwise added thereto while the system was so controlled that the inner temperature could not be 0° C. or higher. This was stirred at −5° C. for 30 minutes, and then diisopropylethylamine (33.0 mmol, 5.75 mL), a THF solution (20 mL) of B-1 and DMAP (one spatula) were added thereto. Subsequently, this was stirred at room temperature for 4 hours. Methanol (5 mL) was added to stop the reaction, and then water and ethyl acetate were added. From the organic layer extracted with ethyl acetate, the solvent was removed with a rotary evaporator to give a crude product of C-1.

To an acetonitrile solution (67 mL) of the aldehyde C-1, added were an aqueous solution (2 mL) of sodium chlorite (42.0 mmol, 3.80 g), an aqueous solution (8.2 mL) of sodium dihydrogenphosphate dehydrate (6.0 mmol, 0.94 g), and aqueous hydrogen peroxide (4.0 mL), and stirred at room temperature for 12 hours. 100 mL of an aqueous 1 N hydrochloric acid solution was added thereto, and then filtered. The residue was washed with a small amount of acetonitrile to quantitatively give the carboxylic acid D-1.

Hydroquinone monomethyl ether (7 mg) was added to a THF solution (3 mL) of methanesulfonyl chloride (6.0 mmol, 0.46 mL) and cooled to have an inner temperature of −5° C. A THF solution (6 mL) of the carboxylic acid D-1 (5.5 mmol, 2.1 g) and diisopropylethylamine (6.0 mmol, 1.1 mL) was added dropwise added thereto while the system was so controlled that the inner temperature could not be 0° C. or higher. This was stirred at −5° C. for 30 minutes, and then diisopropylethylamine (6.0 mmol, 1.1 mL), a THF solution (4 mL) of 4-pentylphenol E-1 (5.0 mmol, 0.82 g), and DMAP (one spatula) were added thereto. Subsequently, this was stirred at room temperature for 2 hours. Methanol (5 mL) was added to stop the reaction, and then water and ethyl acetate were added. From the organic layer extracted with ethyl acetate, the solvent was removed with a rotary evaporator to give a crude product of I-1. This was recrystallized with ethyl acetate and methanol, and the yield of the obtained I-1 was 78%.

$^1$H-NMR (solvent: CDCl$_3$) δ (ppm): 0.9 (t, 3H), 1.2-1.4 (m, 4H), 1.5-1.7 (m, 2H), 1.8-2.0 (m, 4H), 2.6 (t, 2H), 4.1-4.3 (m, 4H), 5.8 (d, 1H), 6.1 (dd, 1H), 6.4 (d, 1H), 6.9-7.0 (m, 2H), 7.1-7.2 (m, 2H), 7.2-7.3 (m, 2H), 7.3-7.4 (m, 2H), 8.1-8.2 (m, 2H), 8.2-8.3 (m, 2H)

The phase transition temperature of the obtained exemplary compound (I-1) was determined through texture observation with a polarization microscope. The compound showed a change from a crystal phase to a smectic A liquid-crystal phase at 74° C. and showed a change from the smectic A liquid-phase to a nematic liquid-crystal phase at 124° C., and changed to an isotropic liquid phase at higher than 166° C.

Example 2

According to the same synthesis method as in Example 1, the compound (I-2) was produced. The compound (I-2) also showed phase transition like the compound (I-1).

[Chem. 36]

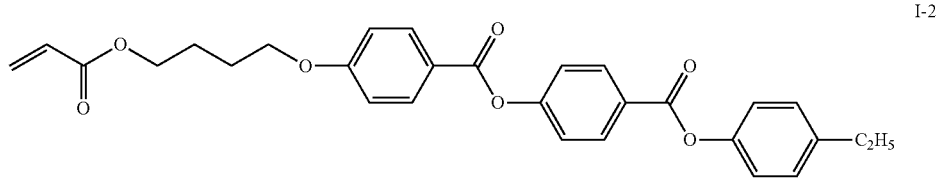

I-2

$^1$H-NMR (solvent: CDCl$_3$) δ (ppm): 1.2 (t, 3H), 1.8-2.0 (m, 4H), 2.6 (d, 2H), 4.1-4.3 (m, 4H), 5.8 (d, 1H), 6.1 (dd, 1H), 6.4 (d, 1H), 6.9-7.0 (m, 2H), 7.1-7.2 (m, 2H), 7.2-7.3 (m, 2H), 7.3-7.4 (m, 2H), 8.1-8.2 (m, 2H), 8.2-8.3 (m, 2H)

Example 3

According to the same synthesis method as in Example 1, the compound (I-3) was produced. The compound (I-3) also showed phase transition like the compound (I-1).

[Chem. 37]

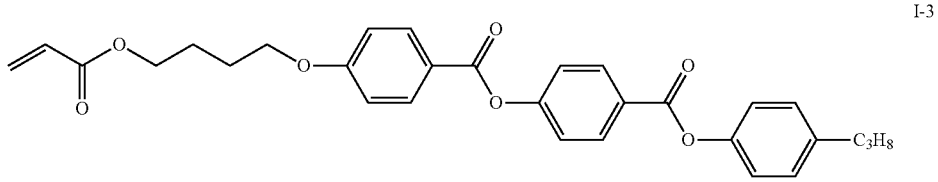

I-3

$^1$H-NMR (solvent: CDCl$_3$) δ (ppm): 0.9 (t, 3H), 1.5-1.6 (m, 2H), 1.8-2.0 (m, 4H), 2.6 (d, 2H), 4.1-4.3 (m, 4H), 5.8 (d, 1H), 6.1 (dd, 1H), 6.4 (d, 1H), 6.9-7.0 (m, 2H), 7.1-7.2 (m, 2H), 7.2-7.3 (m, 2H), 7.3-7.4 (m, 2H), 8.1-8.2 (m, 2H), 8.2-8.3 (m, 2H)

Example 4

According to the same synthesis method as in Example 1, the compound (I-4) was produced. The compound (I-4) also showed phase transition like the compound (I-1).

[Chem. 38]

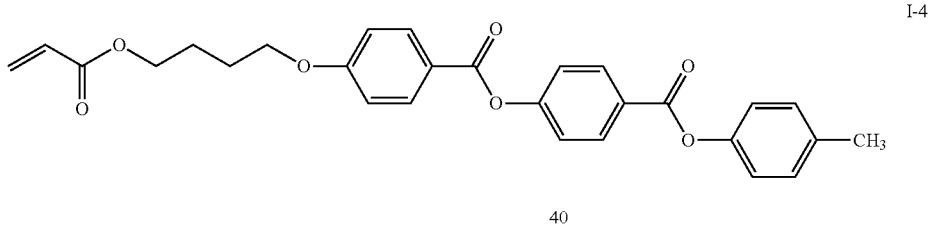

I-4

$^1$H-NMR (solvent: CDCl$_3$) δ (ppm): 1.8-2.0 (m, 4H), 2.3 (s, 3H), 4.1-4.3 (m, 4H), 5.8 (d, 1H), 6.1 (dd, 1H), 6.4 (d, 1H), 6.9-7.0 (m, 2H), 7.1-7.2 (m, 2H), 7.2-7.3 (m, 2H), 7.3-7.4 (m, 2H), 8.1-8.2 (m, 2H), 8.2-8.3 (m, 2H)

Example 11

Preparation of Polymerizable Composition

Using the polymerizable liquid-crystal compound (I-1) of the invention synthesized in Example 1, a liquid-crystal composition was prepared according to the method mentioned below.

First, a liquid-crystal composition coating liquid (1) composed of the following ingredients was prepared.

| | |
|---|---|
| Compound (I-1) mentioned above | 20 parts by mass |
| Polymerizable liquid-crystal compound (II) mentioned below | 80 parts by mass |
| MEK | 233 parts by mass |

[Chem. 39]

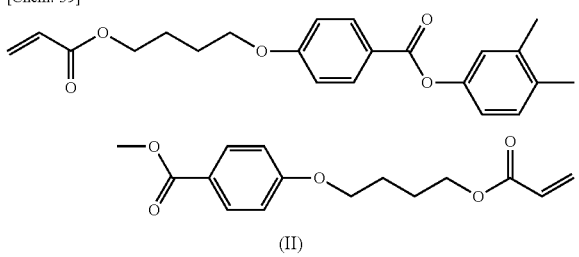

(II)

<Production of Film>

Next, using the obtained liquid-crystal composition, a film of Example 11 was produced.

A polyimide alignment film SE-130 by Nissan chemical was formed on a washed glass substrate according to a spin coating method. After dried, this was baked at 250° C. for 1 hour. This was rubbed to give an alignment film-attached substrate. The liquid-crystal composition coating liquid (1) was applied to the rubbed surface of the alignment film of the substrate, according to a spin coating method at room temperature, and then statically left as such at room temperature for 30 minutes.

(Evaluation of Crystal Deposition Prevention)

Using a polarization microscope, the liquid-crystal layer surface of the film obtained in Example 11 was visually checked in an arbitrary region thereof to determine the ratio of crystal deposition therein, which was 10%.

Examples 12 to 14 and Comparative Examples 1 to 6

In the same manner as in Example 11 except that the compound shown in Table 1 below was used in place of the compound (I-1) of Example 11, a liquid-crystal composition coating liquid was prepared and the crystal deposition ratio was determined. The results are shown in Table 1 below.

TABLE 1

|  | Polymerizable Liquid-Crystal Compound of the Invention | Other Polymerizable Liquid-Crystal Compound | Crystal Deposition Ratio/% |
| --- | --- | --- | --- |
| Example 11 | Compound (I-1) | Polymerizable Liquid-Crystal Compound (II) | 10 |
| Example 12 | Compound (I-2) | Polymerizable Liquid-Crystal Compound (II) | 3 |
| Example 13 | Compound (I-3) | Polymerizable Liquid-Crystal Compound (II) | 10 |
| Example 14 | Compound (I-4) | Polymerizable Liquid-Crystal Compound (II) | 10 |
| Comparative Example 1 | Comparative Compound (III-1) | Polymerizable Liquid-Crystal Compound (II) | 100 |
| Comparative Example 2 | Comparative Compound (III-2) | Polymerizable Liquid-Crystal Compound (II) | 90 |
| Comparative Example 3 | Comparative Compound (III-3) | Polymerizable Liquid-Crystal Compound (II) | 100 |
| Comparative Example 4 | Comparative Compound (III-4) | Polymerizable Liquid-Crystal Compound (II) | 90 |
| Comparative Example 5 | Comparative Compound (III-5) | Polymerizable Liquid-Crystal Compound (II) | 30 |
| Comparative Example 6 | Comparative Compound (III-6) | Polymerizable Liquid-Crystal Compound (II) | 30 |

[Chem. 40]
Comparative Compound (III-1)

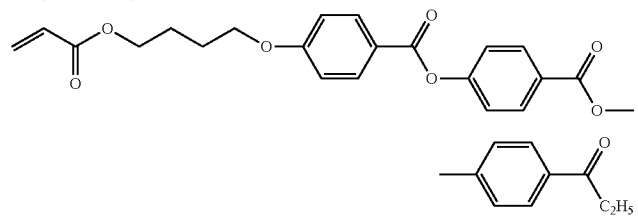

III-1

Comparative Compound (III-2)

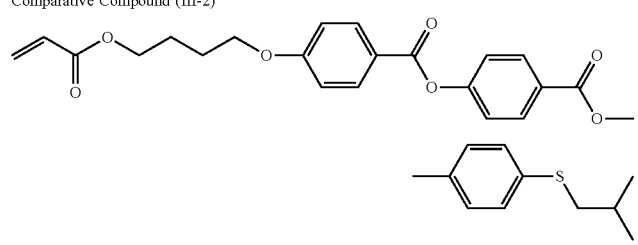

III-2

Comparative Compound (III-3)

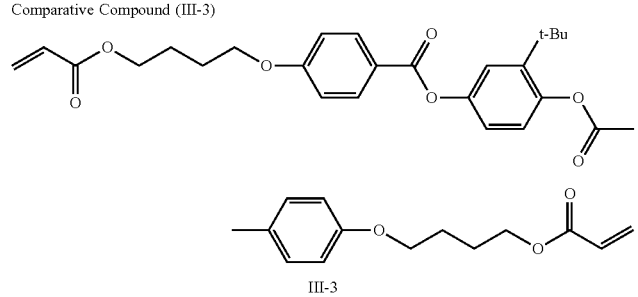

III-3

TABLE 1-continued

| Polymerizable Liquid-Crystal Compound of the Invention | Other Polymerizable Liquid-Crystal Compound | Crystal Deposition Ratio/% |
| --- | --- | --- |

Comparative Compound (III-4)

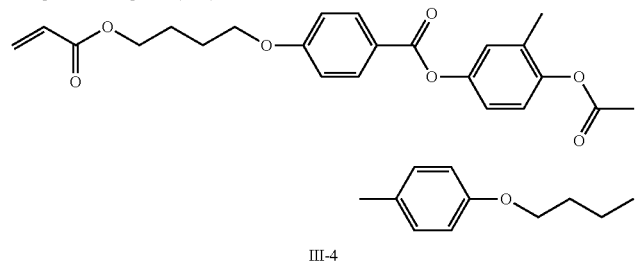

III-4

Comparative Compound (III-5)

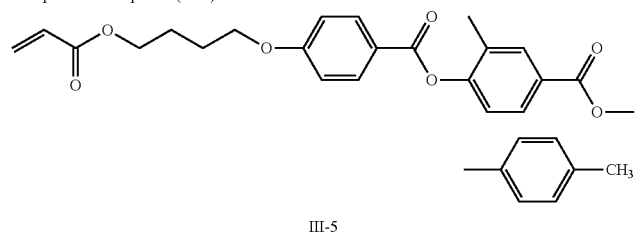

III-5

Comparative Compound (III-6)

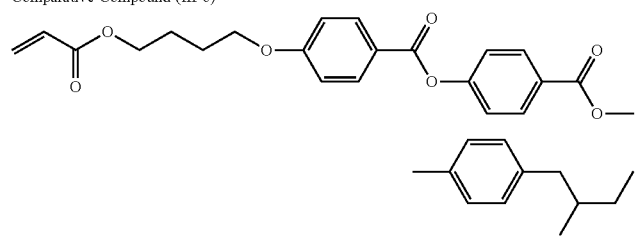

III-6

The results of Examples 11 to 14 and Comparative Examples 1 to 6 confirm that addition of the compound represented by the general formula (I) of the invention, as synthesized in Examples 1 to 4, more significantly inhibited crystal deposition of the polymerizable liquid-crystal compound (II) as compared with the other conventional polymerizable liquid-crystal compounds.

Example 15

Using the compound (I-1), a liquid-crystal composition (15) was prepared according to the method mentioned below.

| | |
| --- | --- |
| Exemplary compound (I-1) | 20 parts by mass |
| Polymerizable liquid-crystal compound (II) | 80 parts by mass |
| Chiral agent, Paliocolor LC756 (by BASF) | 3 parts by mass |
| Air interface alignment agent (X1-1) | 0.04 parts by mass |

-continued

| | |
| --- | --- |
| Polymerization initiator, IRGACURE 819 (by Ciba Japan) | 3 parts by mass |
| Solvent, chloroform | 300 parts by mass |

[Chem. 41]

Air Interface Alignment Agent (X1-1)

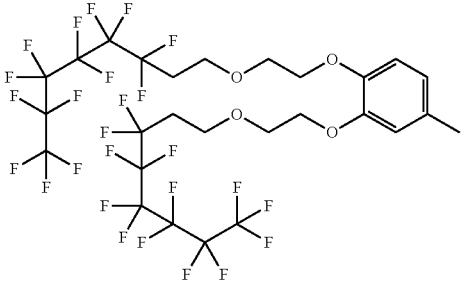

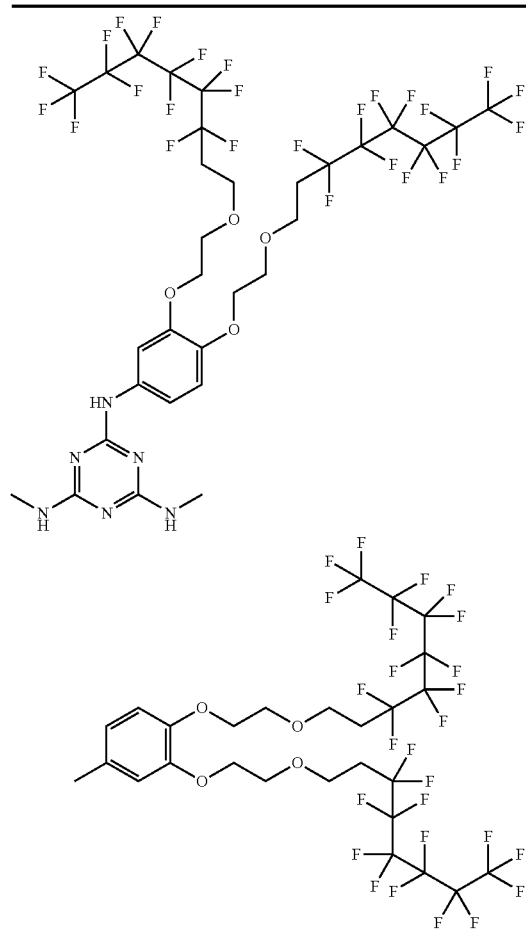

The liquid-crystal composition (15) was applied at room temperature onto the surface of the alignment film of the alignment film-attached substrate produced in the same manner as in Example 11, according to a spin coating method, and then aligned and ripened at 120° C. for 3 minutes, and thereafter using a high-pressure mercury lamp from which the UV short wave component had been removed, this was photoirradiated for 10 seconds at room temperature for alignment fixation, thereby giving a selective reflection film. During the period after coating and before heating, no crystal deposited out in the coating film.

The obtained, selective reflection film was observed with a polarization microscope, which confirmed that the film was uniformly oriented with no alignment defects therein. Further, the film was analyzed with a spectrophotometer, Shimadzu's UV-3100PC for the transmission spectrum thereof, which gave a selective reflection peak in the IR region.

Liquid-crystal composition coating liquids were prepared in the same manner as in Example 15 except that the compound (I-2) to the compound (I-4) were used in place of the exemplary compound (I-1). Using these coating liquid and in the same manner as in Example 15, selective reflection films were produced. All these selective reflection films exhibited good orientation performance. Each film was analyzed with a spectrophotometer UV-3100PC for the transmission spectrum thereof, which gave a selective reflection peak in the IR region.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2012/072592, filed Sep. 5, 2012; Japanese Application No. 2011-195958, filed Sep. 8, 2011; and Japanese Application No. 2012-028885, filed Feb. 13, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polymerizable liquid-crystal compound represented by the following general formula (I):

General Formula (I)

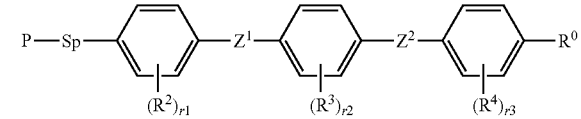

wherein P represents a polymerizable functional group selected from the groups represented by the following formulae (P-1) to (P-5), in which $R^{11}$ to $R^{13}$ each represent a hydrogen atom or a methyl group;

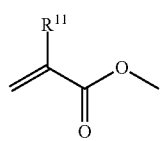

(P-1)

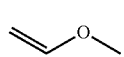

(P-2)

(P-3)

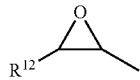

(P-4)

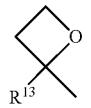

(P-5)

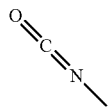

Sp represents a spacer or a single bond;

$Z^1$ and $Z^2$ each represent —CO—O—;

$R^0$ represents an unsubstituted linear alkyl group having from 1 to 8 carbon atoms;

$R^2$ and $R^3$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;

$R^4$ represents an alkyl group having from 2 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms a cyano group, an amino group, a hydroxyl group or a halogen atom;

$r_1$, $r_2$ and $r_3$ each independently indicate an integer of from 0 to 4; when $r_1$, $r_2$ and $r_3$ each are 2 or more, then $R^2$, $R^3$ and $R^4$ each may be the same or different; when $R^0$ is a methyl group, then $r_2$ is not 1.

2. The polymerizable liquid-crystal compound according to claim 1, wherein the spacer to be represented by Sp in the general formula (I) is a linking group represented by the following general formula (Sp-1):

$$-(R^{41}-Z^{41})_m-\qquad \text{General Formula (Sp-1)}$$

wherein $R^{41}$ represents a substituted or unsubstituted alkylene group, a substituted or unsubstituted alkenylene group, or a substituted or unsubstituted alkynylene group, $Z^{41}$ represents —O—, —S—, —CO—, —CO—O—, —O—CO—, —S—CO—, —CO—S—, —O—CO—O—, —CO—NR$^{51}$—, —NR$^{51}$—CO—, —CR$^{51}$=N—, —N=CR$^{51}$— or a single bond in which $R^{51}$ represents a hydrogen atom or an alkyl group having from 1 to 12 carbon atoms, m indicates an integer of from 1 to 6; when m is an integer of 2 or more, then multiple $R^{41}$'s in Sp may be the same or different, and multiple $Z^{41}$'s in Sp may be the same or different.

3. A polymerizable composition containing at least one polymerizable liquid-crystal compound of claim 1.

4. The polymerizable composition according to claim 3, containing a polymerizable liquid-crystal compound represented by the following general formula (II):

5. The polymerizable liquid-crystal composition according to claim 4, containing the polymerizable liquid-crystal compound represented by the general formula (I) in a ratio of from 3 to 50% by mass relative to the polymerizable liquid-crystal compound represented by the general formula (II).

6. The polymerizable liquid-crystal composition according to claim 4, containing the polymerizable liquid-crystal compound represented by the general formula (I) in a ratio of from 5 to 40% by mass relative to the polymerizable liquid-crystal compound represented by the general formula (II).

7. The polymerizable composition according to claim 3, further containing at least one polymerization initiator.

8. The polymerizable composition according to claim 3, further containing at least one chiral compound.

9. A method for producing a polymer material, which comprises polymerizing a polymerizable liquid-crystal compound represented by the following general formula (I):

General Formula (I)

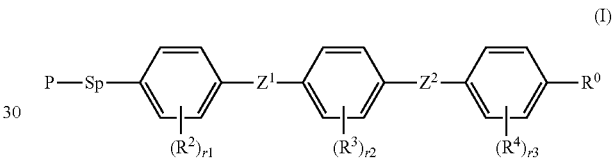

(I)

wherein P represents a polymerizable functional group selected from the groups represented by the following formulae (P-1) to (P-5), in which $R^{11}$ to $R^{13}$ each represent a hydrogen atom or a methyl group;

(P-1)

(P-2)

(P-3)

(II)

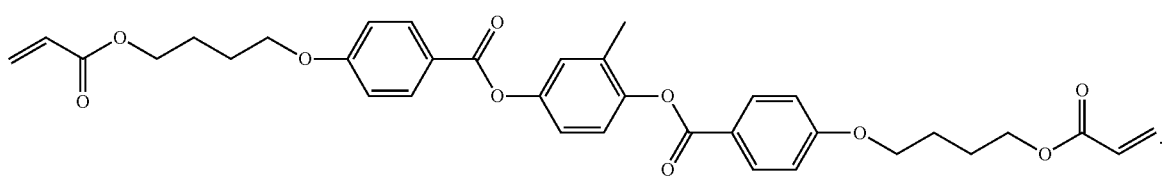

-continued

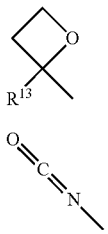
(P-4)

(P-5)

Sp represents a spacer or a single bond;
Z$^1$ and Z$^2$ each represent —CO—O—;
R$^0$ represents an unsubstituted linear alkyl group having from 1 to 8 carbon atoms;
R$^2$ and R$^3$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
R$^4$ represents an alkyl group having from 2 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
$r_1$, $r_2$ and $r_3$ each independently indicate an integer of from 0 to 4; when $r_1$, $r_2$ and $r_3$ each are 2 or more, then R$^2$, R$^3$ and R$^4$ each may be the same or different; when R$^0$ is a methyl group, then $r_2$ is not 1.

10. The method for producing a polymer material according to claim 9, wherein the polymerization is attained through irradiation with UV rays.

11. A polymer material produced by polymerizing a polymerizable liquid-crystal compound represented by the following general formula (I):

General Formula (I)

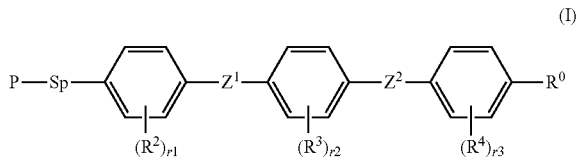
(I)

wherein P represents a polymerizable functional group selected from the groups represented by the following formulae (P-1) to (P-5), in which R$^{11}$ to R$^{13}$ each represent a hydrogen atom or a methyl group;

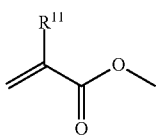
(P-1)

-continued

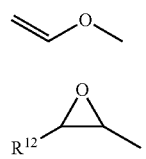
(P-2)

(P-3)

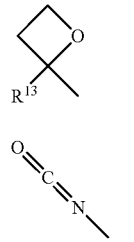
(P-4)

(P-5)

Sp represents a spacer or a single bond;
Z$^1$ and Z$^2$ each represent —CO—O—;
R$^0$ represents an unsubstituted linear alkyl group having from 1 to 8 carbon atoms;
R$^2$ and R$^3$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
R$^4$ represents an alkyl group having from 2 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
$r_1$, $r_2$ and $r_3$ each independently indicate an integer of from 0 to 4; when $r_1$, $r_2$ and $r_3$ each are 2 or more, then R$^2$, R$^3$ and R$^4$ each may be the same or different; when R$^0$ is a methyl group, then $r_2$ is not 1.

12. A film containing at least one polymer material produced by polymerizing a polymerizable liquid-crystal compound represented by the following general formula (I):

General Formula (I)

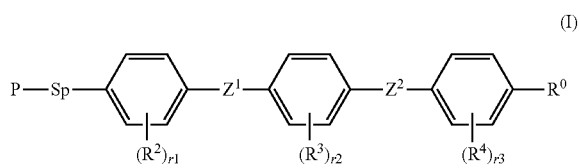
(I)

wherein P represents a polymerizable functional group selected from the groups represented by the following formulae (P-1) to (P-5), in which R$^{11}$ to R$^{13}$ each represent a hydrogen atom or a methyl group;

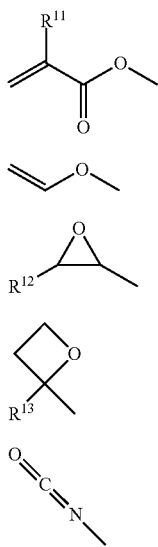

Sp represents a spacer or a single bond;
Z$^1$ and Z$^2$ each represent —CO—O—;
R$^0$ represents an unsubstituted linear alkyl group having from 1 to 8 carbon atoms;
R$^2$ and R$^3$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
R$^4$ represents an alkyl group having from 2 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
r$_1$, r$_2$ and r$_3$ each independently indicate an integer of from 0 to 4; when r$_1$, r$_2$ and r$_3$ each are 2 or more, then R$^2$, R$^3$ and R$^4$ each may be the same or different; when R$^0$ is a methyl group, then r$_2$ is not 1.

13. A film produced by fixing the cholesteric liquid-crystal phase of a polymerizable composition containing a chiral compound and a polymerizable liquid-crystal compound represented by the following general formula (I):

General Formula (I)

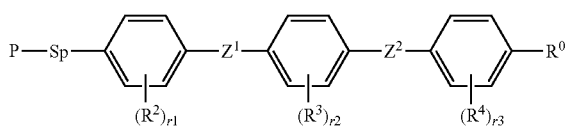

wherein P represents a polymerizable functional group selected from the groups represented by the following formulae (P-1) to (P-5), in which R$^{11}$ to R$^{13}$ each represent a hydrogen atom or a methyl group:

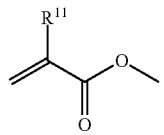

Sp represents a spacer or a single bond;
Z$^1$ and Z$^2$ each represent —CO—O—;
R$^0$ represents an unsubstituted linear alkyl group having from 1 to 8 carbon atoms;
R$^2$ and R$^3$ each independently represent an alkyl group having from 1 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
R$^4$ represents an alkyl group having from 2 to 4 carbon atoms, an alkoxy group having from 1 to 4 carbon atoms, an alkoxycarbonyl group having from 2 to 5 carbon atoms, an acyloxy group having from 2 to 5 carbon atoms, an acyl group having from 2 to 4 carbon atoms, an amide group having from 2 to 5 carbon atoms, a cyano group, an amino group, a hydroxyl group, or a halogen atom;
r$_1$, r$_2$ and r$_3$ each independently indicate an integer of from 0 to 4; when r$_1$, r$_2$ and r$_3$ each are 2 or more, then R$^2$, R$^3$ and R$^4$ each may be the same or different; when R$^0$ is a methyl group, then r$_2$ is not 1.

14. The film according to claim 12, exhibiting optical anisotropy.

15. The film according to claim 12, exhibiting a selective reflection characteristic.

16. The film according to claim 12, exhibiting a selective reflection characteristic in an IR wavelength range.

* * * * *